(12) United States Patent
Go et al.

(10) Patent No.: US 11,865,615 B2
(45) Date of Patent: Jan. 9, 2024

(54) TECHNIQUES FOR DEPOWDERING ADDITIVELY FABRICATED PARTS AND RELATED SYSTEMS AND METHODS

(71) Applicant: Desktop Metal, Inc., Burlington, MA (US)

(72) Inventors: Jamison Go, Orlando, FL (US);
Emanuel M. Sachs, Newton, MA (US);
Michael Goldblatt, Lincoln, MA (US);
Jeffrey von Loesecke, Hingham, MA (US)

(73) Assignee: Desktop Metal, Inc., Burlington, MA (US)

( * ) Notice: Subject to any disclaimer, the term of this patent is extended or adjusted under 35 U.S.C. 154(b) by 321 days.

(21) Appl. No.: 17/117,200

(22) Filed: Dec. 10, 2020

(65) Prior Publication Data
US 2021/0237159 A1 Aug. 5, 2021

Related U.S. Application Data

(60) Provisional application No. 62/946,570, filed on Dec. 11, 2019.

(51) Int. Cl.
*B22F 10/68* (2021.01)
*B33Y 40/20* (2020.01)
(Continued)

(52) U.S. Cl.
CPC ............... *B22F 10/68* (2021.01); *B03C 1/30* (2013.01); *B08B 5/02* (2013.01); *B08B 7/04* (2013.01); *B33Y 40/20* (2020.01); *B03C 2201/20* (2013.01)

(58) Field of Classification Search
None
See application file for complete search history.

(56) References Cited

U.S. PATENT DOCUMENTS

| 5,658,412 A | 8/1997 | Retallick et al. |
| 6,932,935 B1 | 8/2005 | Oberhofer et al. |

(Continued)

FOREIGN PATENT DOCUMENTS

| EP | 3 434 448 A1 | 1/2019 | |
| KR | 20160028907 | * 3/2016 | ............. B01D 35/06 |

OTHER PUBLICATIONS

KR20160028907 English translation, accessed on Mar. 2023. (Year: 2016).*

(Continued)

*Primary Examiner* — Eric W Golightly
*Assistant Examiner* — Arlyn I Rivera-Cordero
(74) *Attorney, Agent, or Firm* — Wolf, Greenfield & Sacks, P.C.

(57) ABSTRACT

Techniques for depowdering additively fabricated parts are described. The techniques utilize various mechanisms to separate powder from parts. For instance, techniques for depowdering described herein may include fabrication of auxiliary structures in addition to fabrication of parts. Certain auxiliary structures may aid with depowdering operations, and may be fabricated along with parts during an additive fabrication process. The auxiliary structures may be shaped and/or have positional and/or geometrical relationships to the parts during fabrication. For instance, an auxiliary structure may include a cage structure fabricated around one or more parts.

4 Claims, 24 Drawing Sheets

(51) Int. Cl.
   B08B 7/04   (2006.01)
   B03C 1/30   (2006.01)
   B08B 5/02   (2006.01)

(56) References Cited

U.S. PATENT DOCUMENTS

| | | |
|---|---|---|
| 8,545,209 B2 | 10/2013 | Shi et al. |
| 9,887,356 B2 | 2/2018 | McAlpine et al. |
| 10,377,061 B2 | 8/2019 | Wolfgang et al. |
| 10,406,751 B2 | 9/2019 | Fulop et al. |
| 10,500,789 B2 | 12/2019 | Fulop et al. |
| 11,207,733 B2 | 12/2021 | Pourcher et al. |
| 11,491,720 B2 | 11/2022 | Jordan |
| 2001/0045678 A1 | 11/2001 | Kubo et al. |
| 2002/0090410 A1 | 7/2002 | Tochimoto et al. |
| 2004/0003738 A1 | 1/2004 | Imiolek et al. |
| 2004/0084814 A1 | 5/2004 | Boyd et al. |
| 2005/0001356 A1 | 1/2005 | Tochimoto et al. |
| 2008/0060330 A1 | 3/2008 | Davidson et al. |
| 2009/0211616 A1 | 8/2009 | Tafoya |
| 2009/0255912 A1 | 10/2009 | Dietrich |
| 2009/0283119 A1 | 11/2009 | Moussa et al. |
| 2011/0186081 A1 | 8/2011 | Dunn et al. |
| 2011/0300248 A1 | 12/2011 | Tung et al. |
| 2013/0026680 A1 | 1/2013 | Ederer et al. |
| 2013/0052291 A1 | 2/2013 | Morikawa |
| 2013/0075957 A1 | 3/2013 | Swanson et al. |
| 2013/0241095 A1 | 9/2013 | Korten et al. |
| 2013/0244040 A1 | 9/2013 | Oshima |
| 2014/0141961 A1 | 5/2014 | Koszo et al. |
| 2015/0258744 A1 | 9/2015 | Muller et al. |
| 2015/0314389 A1 | 11/2015 | Yamada |
| 2016/0200053 A1 | 7/2016 | Chen et al. |
| 2016/0263827 A1 | 9/2016 | Fripp et al. |
| 2016/0318253 A1 | 11/2016 | Barnhart |
| 2016/0325507 A1 | 11/2016 | Chu et al. |
| 2016/0368224 A1 | 12/2016 | Ooba et al. |
| 2017/0071707 A1 | 3/2017 | Uckelmann et al. |
| 2017/0144874 A1 | 5/2017 | Huebinger et al. |
| 2017/0239893 A1 | 8/2017 | Hoover et al. |
| 2017/0297097 A1 | 10/2017 | Gibson et al. |
| 2017/0348910 A1 | 12/2017 | Hutchinson |
| 2018/0133968 A1 | 5/2018 | Zeulner |
| 2018/0193887 A1 | 7/2018 | Pourcher et al. |
| 2018/0297114 A1 | 10/2018 | Preston et al. |
| 2018/0297284 A1 | 10/2018 | Fulop et al. |
| 2018/0305266 A1 | 10/2018 | Gibson et al. |
| 2018/0307209 A1 | 10/2018 | Chin et al. |
| 2018/0370213 A1 | 12/2018 | Gold et al. |
| 2019/0022942 A1 | 1/2019 | Fulop et al. |
| 2019/0030810 A1 | 1/2019 | Gasso et al. |
| 2019/0039367 A1 | 2/2019 | Roman et al. |
| 2019/0076924 A1 | 3/2019 | Jepeal et al. |
| 2019/0084229 A1 | 3/2019 | Gunther |
| 2019/0143597 A1 | 5/2019 | Huang et al. |
| 2019/0160537 A1* | 5/2019 | Hofmann ............... B33Y 30/00 |
| 2019/0240913 A1 | 8/2019 | Jordan |
| 2021/0008808 A1 | 1/2021 | Cudzilo et al. |
| 2021/0046519 A1 | 2/2021 | Go et al. |
| 2021/0053121 A1 | 2/2021 | Go et al. |

OTHER PUBLICATIONS

International Search Report and Written Opinion dated Aug. 29, 2018 in connection with International Application No. for PCT/US2018/027611, 16 pages.

International Preliminary Report on Patentability dated Oct. 24, 2019 in connection with International Application No. PCT/US2018/027611, 12 pages.

International Search Report and Written Opinion dated May 6, 2019 in connection with International Application No. PCT/US2019/016967, 12 pages.

International Preliminary Report on Patentability dated Aug. 20, 2020 in connection with International Application No. PCT/US2019/016967, 10 pages.

* cited by examiner

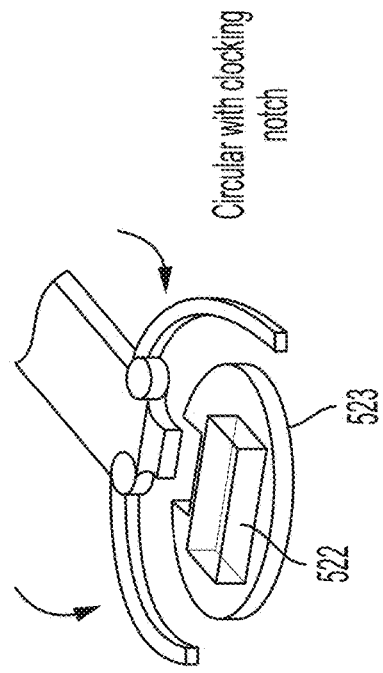
FIG. 5C
Circular with clocking notch
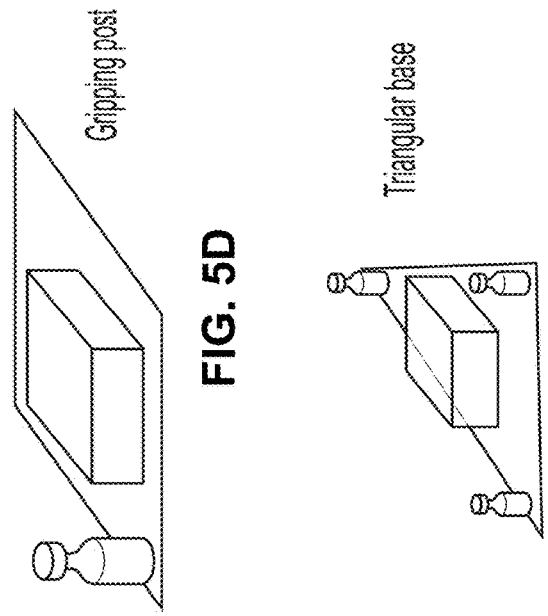
FIG. 5D
Gripping post
FIG. 5E
Triangular base
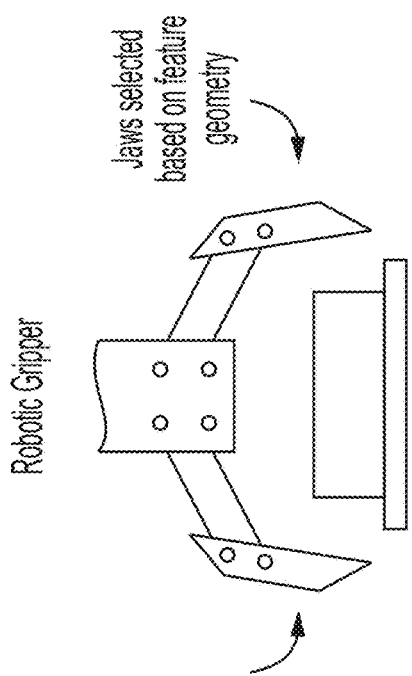
FIG. 5A
Robotic Gripper
Jaws selected based on feature geometry
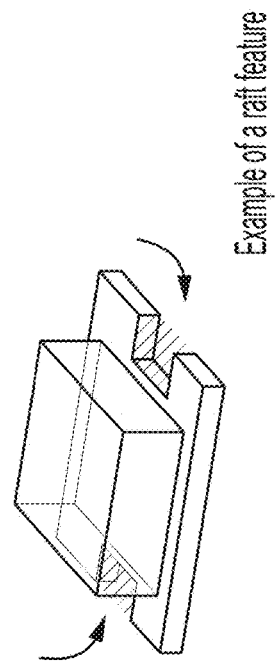
FIG. 5B
Example of a raft feature Powder layer, no flow additive Powder layer, flow additive between particles; lower interparticle adhesion Print heads
No part (jet flow additive)
Part (jetted binder)
No part Less cohesive, more flowable powder

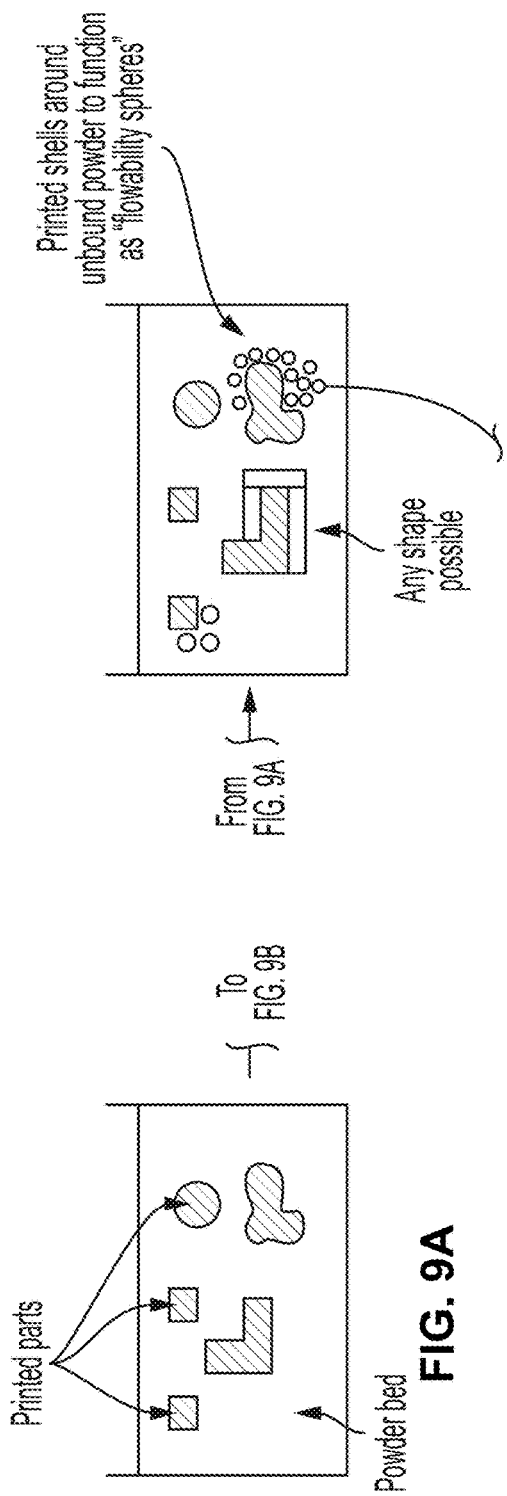
FIG. 9A
FIG. 9B
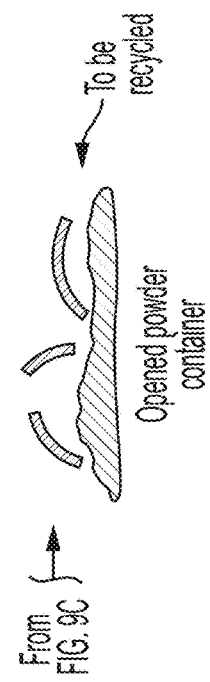
FIG. 9C
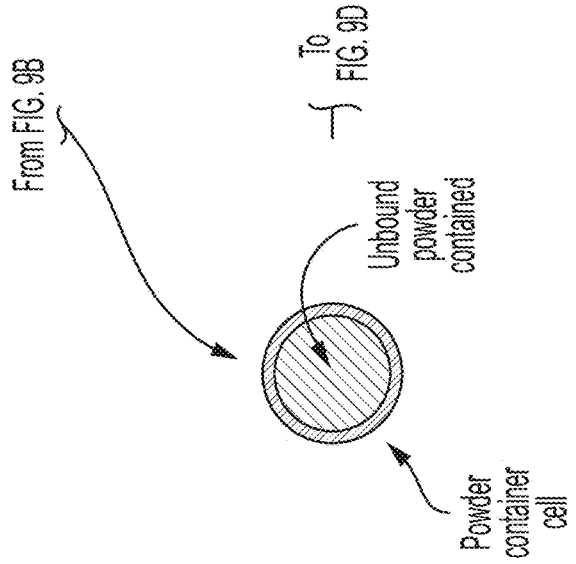
FIG. 9D

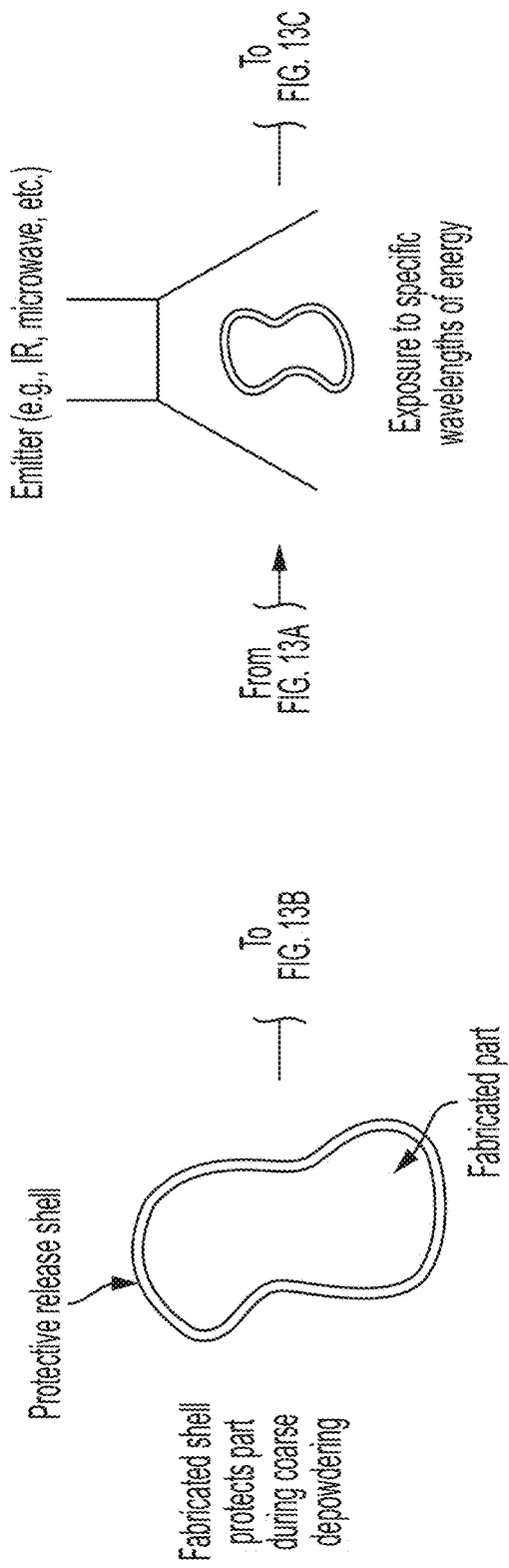
FIG. 13A
FIG. 13B
FIG. 13C
FIG. 13D

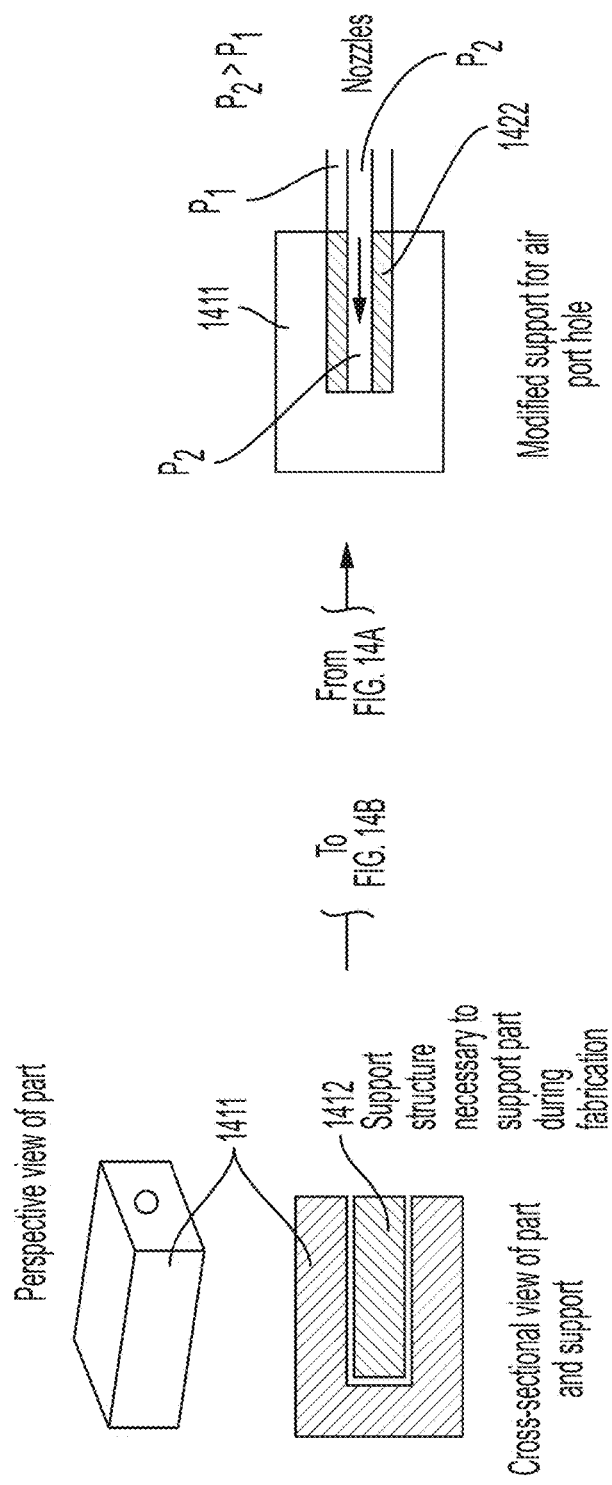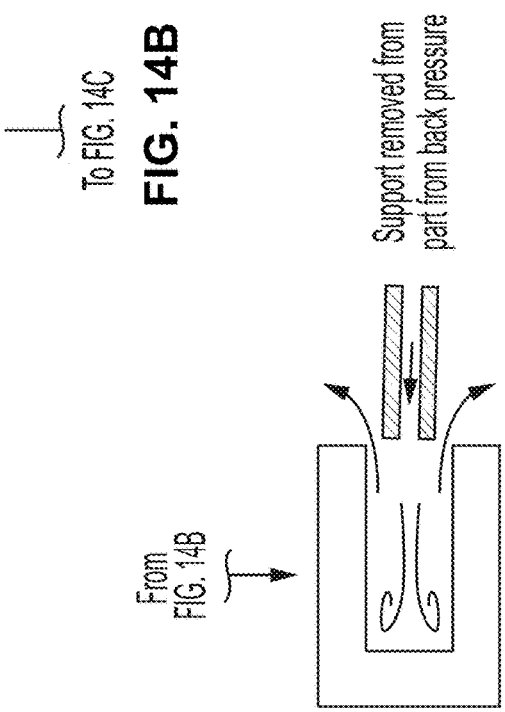

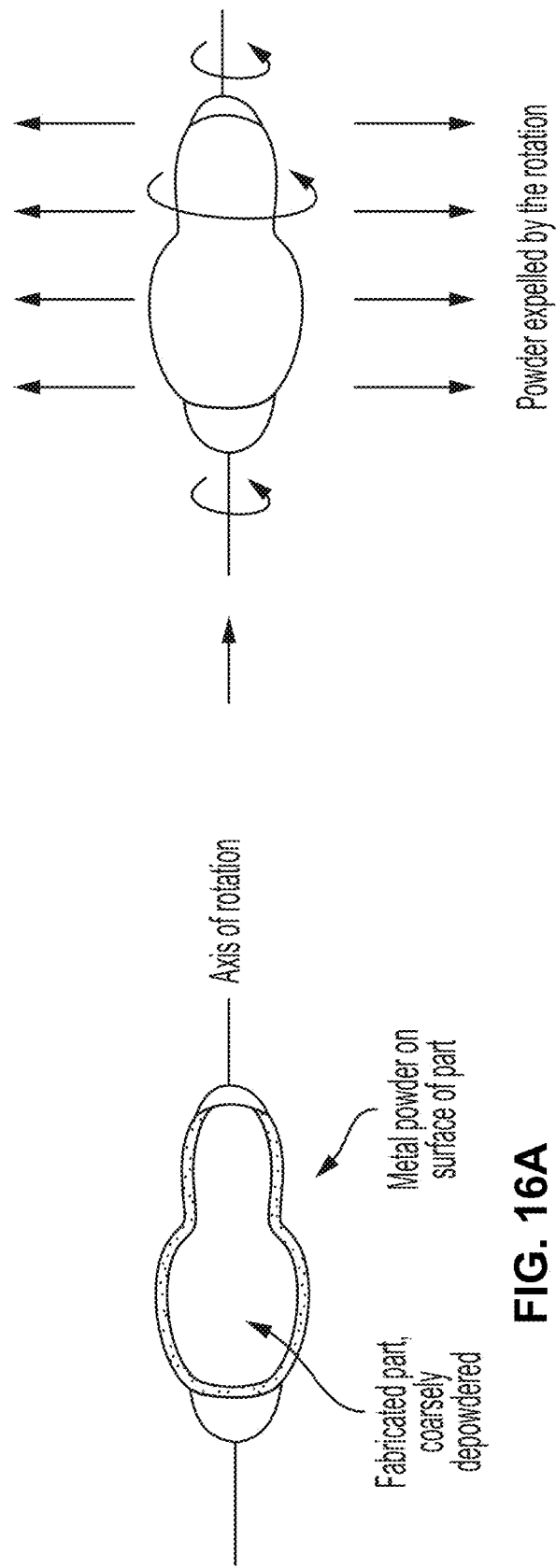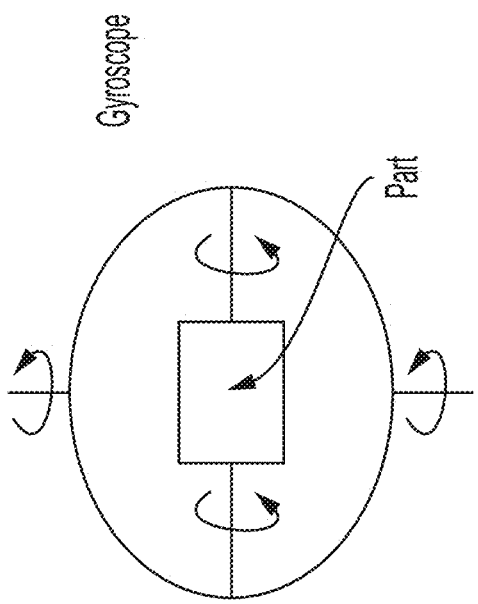
FIG. 16A
FIG. 16B
FIG. 16C

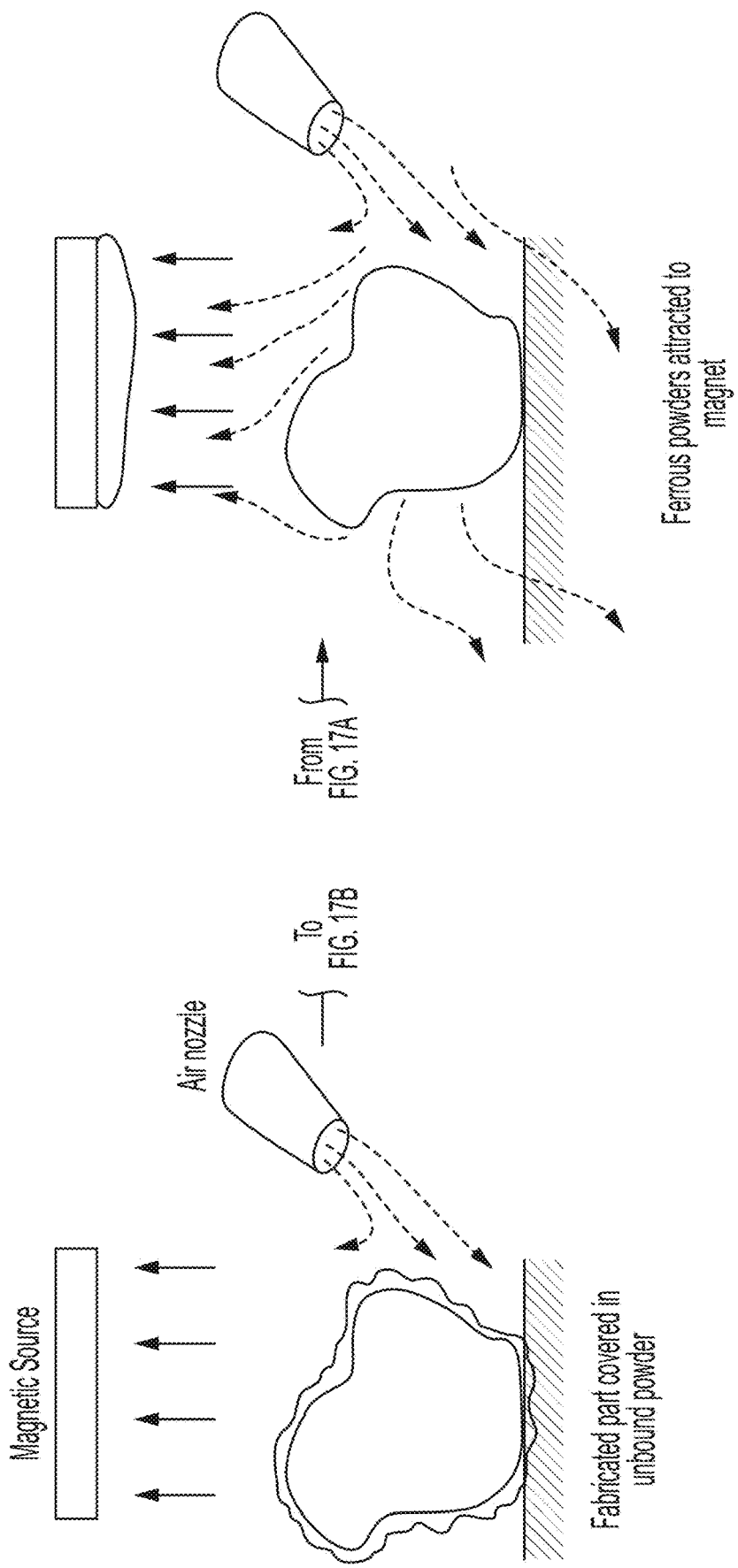

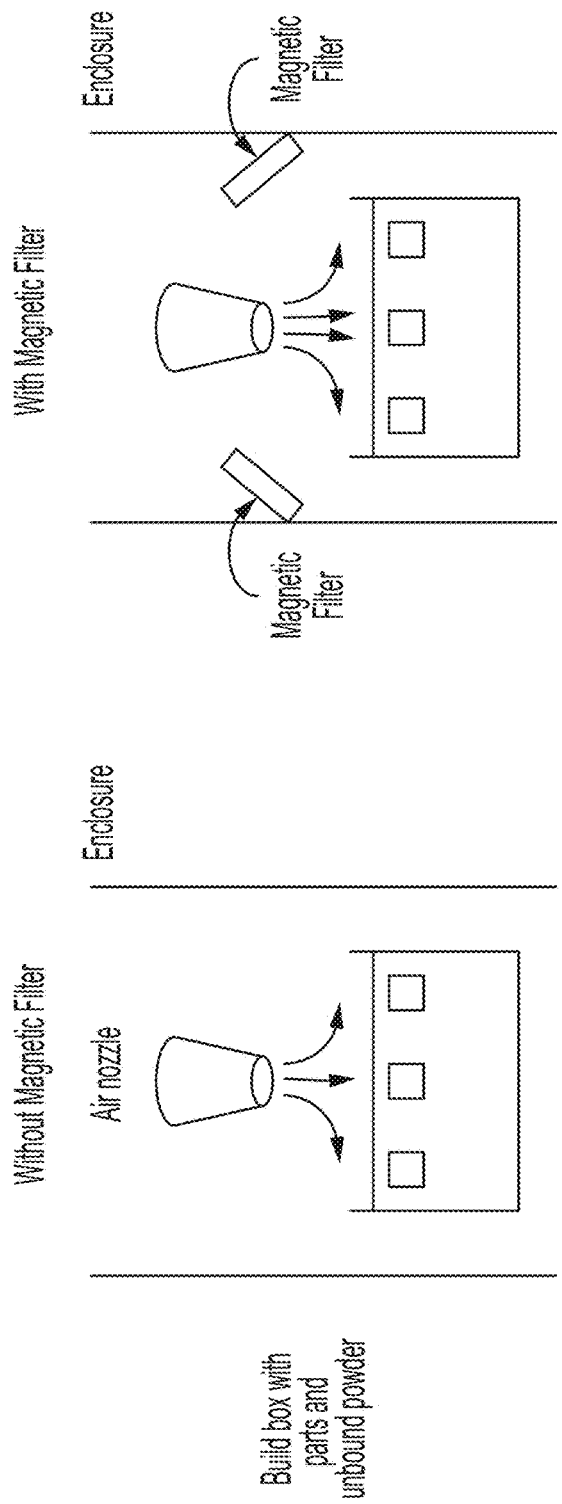
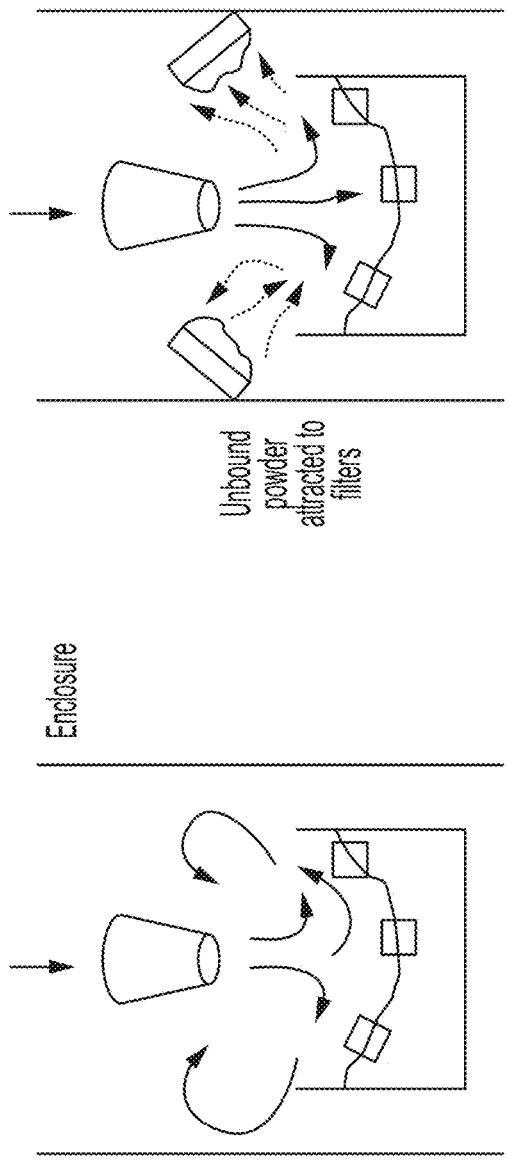

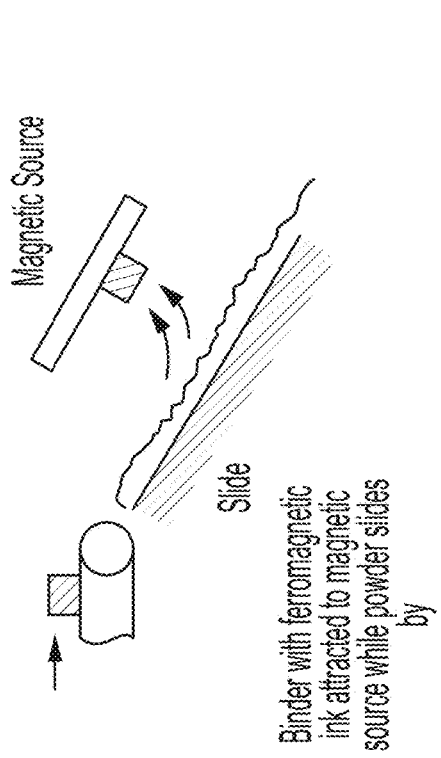
FIG. 19B
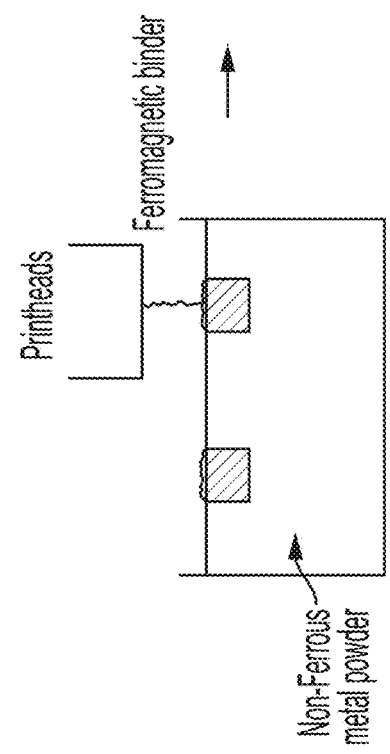
FIG. 19D
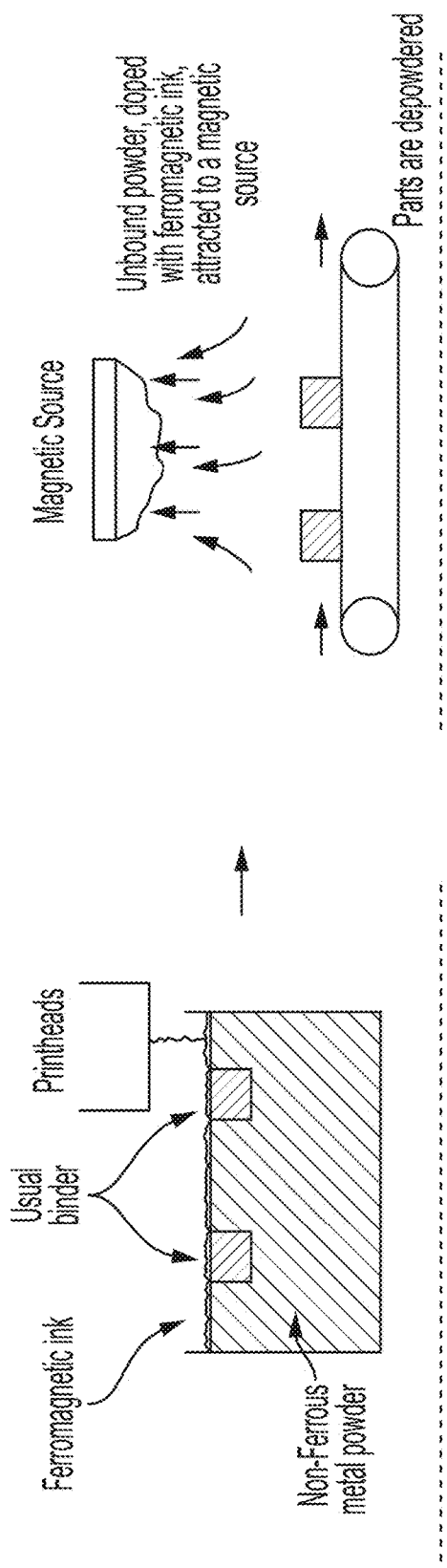
FIG. 19A
FIG. 19C

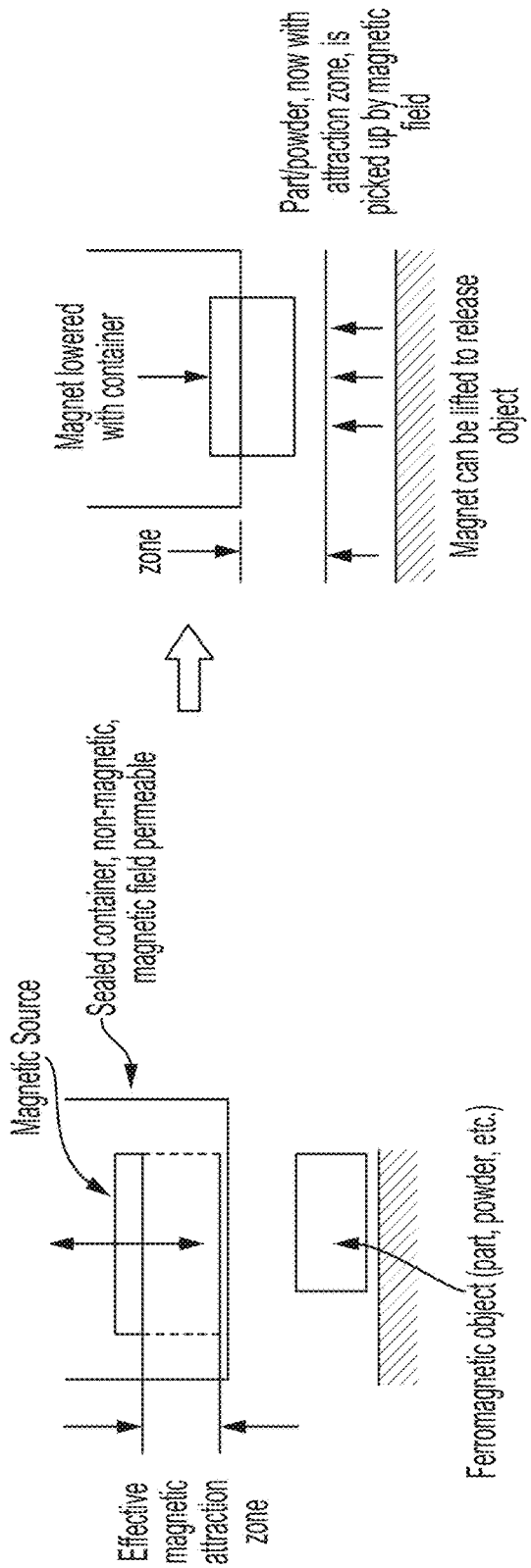
FIG. 20A
FIG. 20B
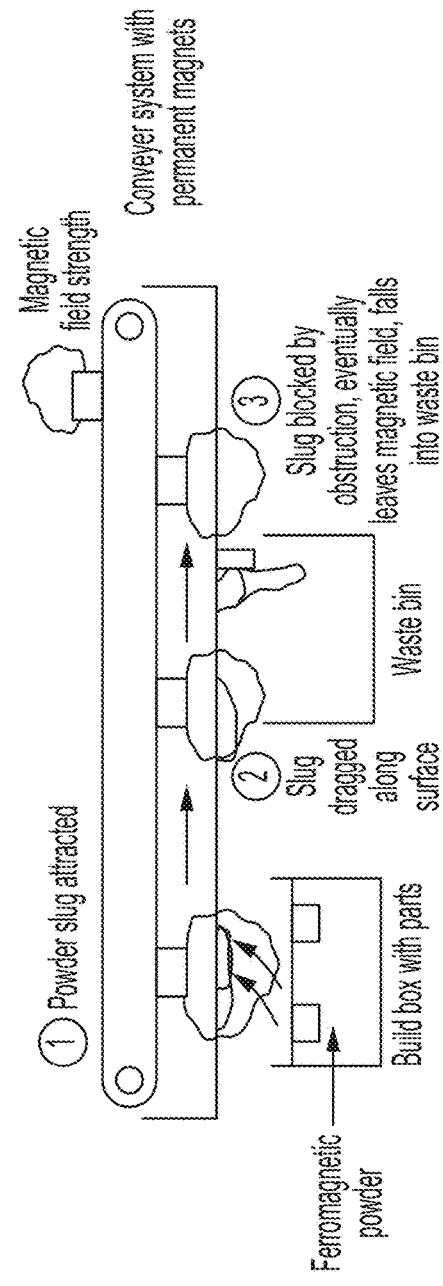
FIG. 20C

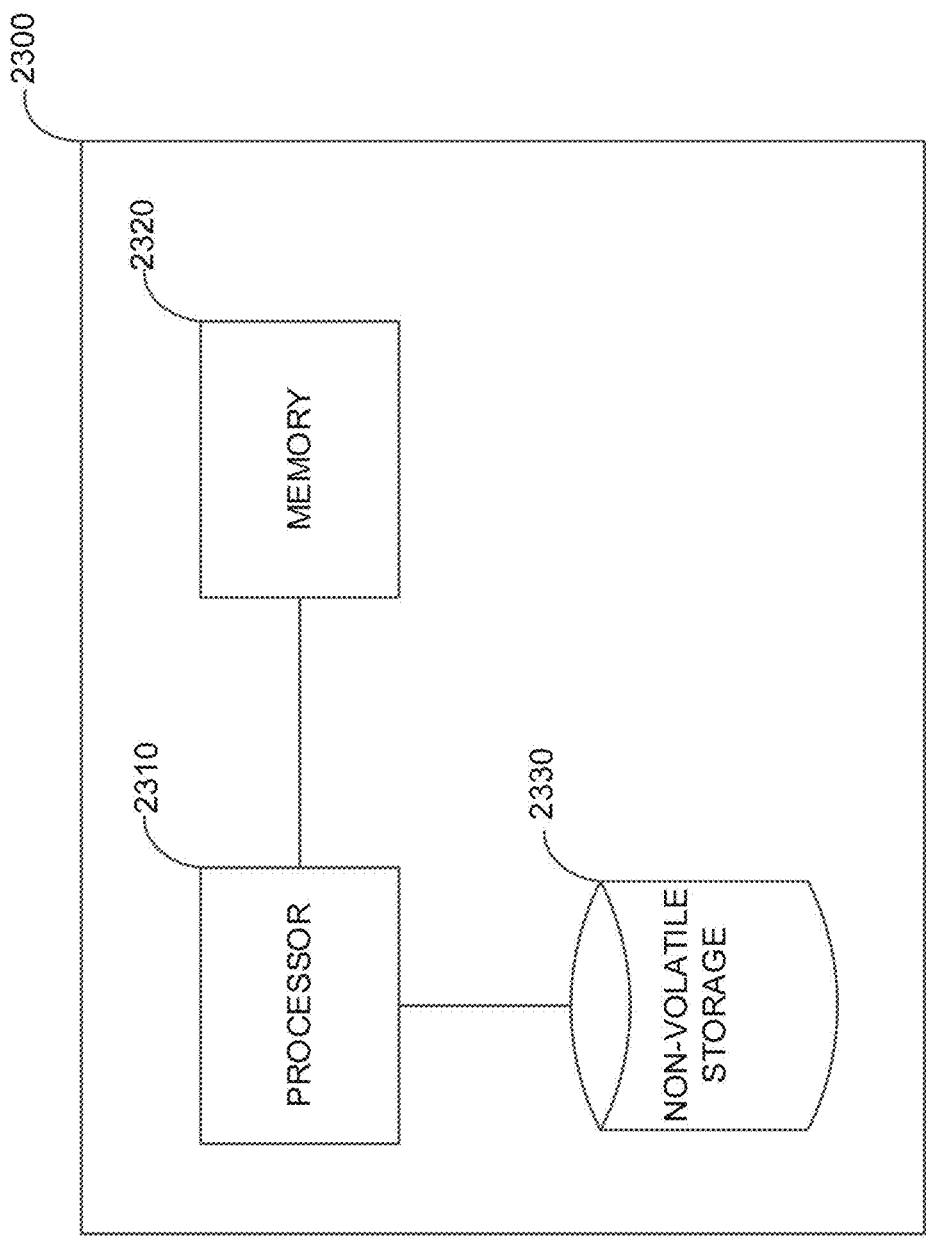

TECHNIQUES FOR DEPOWDERING ADDITIVELY FABRICATED PARTS AND RELATED SYSTEMS AND METHODS

CROSS REFERENCE TO RELATED APPLICATIONS

The present application claims the benefit under 35 U.S.C. § 119(e) of U.S. Provisional Patent Application No. 62/946,570, filed Dec. 11, 2019, titled "Techniques For Depowdering Additively Fabricated Parts and Related Systems and Methods," which is hereby incorporated by reference in its entirety.

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, parts may be fabricated by combining portions of a powder or other granular material to create fully dense parts. For example, additive fabrication techniques known as binder jetting may selectively apply a liquid to portions of a layer of powder, then a subsequent layer of powder may be deposited over the first layer, and additional liquid applied to additional portions of the new layer, and so on. At the end of such a process, the parts are disposed within a volume of the powder from which the parts must be separated.

SUMMARY

According to some aspects, a method is provided for extracting one or more additively fabricated parts from a powder bed comprising a ferromagnetic powder and the one or more additively fabricated parts, the method comprising arranging at least part of the powder bed within an enclosure, the enclosure having one or more magnetic filters arranged within, directing, using one or more nozzles, one or more jets of gas onto a surface of the powder bed within the chamber, and capturing at least some of the ferromagnetic powder on and/or within the one or more magnetic filters.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 5A-5E depict an illustrative example of fabrication of auxiliary structures comprising gripping features, according to some embodiments;

FIGS. 9A-9D depict an illustrative example of modifying voids between parts by forming powder containers, according to some embodiments;

FIGS. 13A-13D depict an illustrative example of modifying a process of binder fluid deposition by forming an activated-release support shell, according to some embodiments;

FIGS. 14A-14C depict an illustrative example of removing support features, according to some embodiments;

FIGS. 16A-16C depict an illustrative example of applying a centripetal force to one or more parts by rotating the part(s), according to some embodiments;

FIGS. 17A-17B depict an illustrative example of applying a magnetic force to a mixture of powder and parts, according to some embodiments;

FIGS. 18A-18D depict an illustrative example of applying a magnetic force to a mixture of powder and parts, according to some embodiments;

FIGS. 19A-19D depict an illustrative example of applying a magnetic force to ferromagnetic binder, according to some embodiments;

FIGS. 20A-20C depict an illustrative example of applying a magnetic force to powder and/or parts while avoiding powder from contaminating the magnetic source, according to some embodiments;

FIG. 23 illustrates an example of a computing system environment on which aspects of the invention may be implemented.

DETAILED DESCRIPTION

Figure 1:
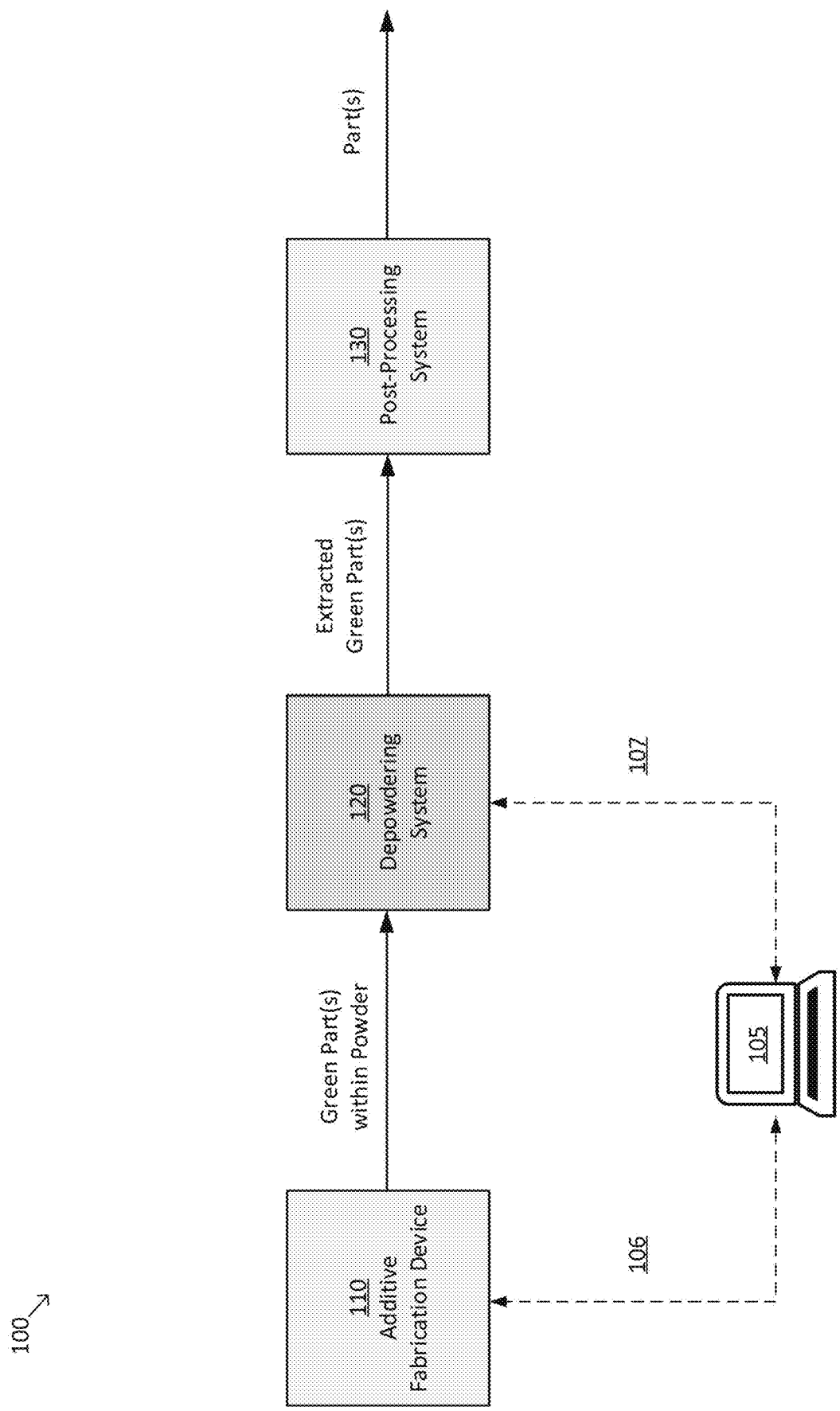
FIG. 1 is a block diagram of an additive fabrication system that includes a depowdering sub-system, according to some embodiments.

As discussed above, some additive manufacturing techniques fabricate parts from and within a granular material such as a powder. One example is binder jetting, in which parts are formed by applying a liquid (e.g., a binder) to regions of successive layers of powder, thereby producing parts (which are 'bound' regions of the powder) within a volume of unbound powder. Such parts are often referred to as "green" parts since they must undergo subsequent processing, such as sintering, to produce a final part. Other illustrative additive fabrication techniques that fabricate parts from a powder include direct laser melting, direct metal laser sintering, or selective laser sintering, in which regions of successive layers of a material (e.g., metal, nylon) are melted through application of directed energy.

Irrespective of how parts are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

Depowdering is frequently a laborious process due to the fine nature of the powder. Handling of the powder may cause a great deal of mess and, depending on the powder material, may also present safety concerns due to inhalation or flammability. Typically, depowdering is performed in a manual process of excavation that utilizes vacuum hoses and brushes to separate the parts from the powder. This process can take a great deal of time and in cases where the parts are fragile, can result in damage to the parts during excavation. Moreover, many powders used for additive fabrication, such as metal and/or ceramic powders, may exhibit low flowability which makes moving particles of the powder difficult due to the tendency of the powder to "clump" rather than flow away from the additively fabricated parts.

While, as discussed above, there are multiple additive fabrication technologies for which depowdering is performed, the process of depowdering may not be equally straightforward for each of these technologies. For instance, direct laser melting may produce metal parts during additive fabrication so that, prior to depowdering, the parts are embedded within a metal powder. Since the parts are solid metal, there is typically not a significant risk of damage to the parts during depowdering and so a wide range of simple techniques may be effective at separating the parts from the powder. In contrast, green parts produced in binder jetting comprise regions of bound powder held together by a liquid and may be considerably more fragile than parts produced by direct laser melting. Consequently, depowdering approaches that are effective for direct laser melting or selective laser sintering may not be suitable for parts produced through binder jetting since they may cause damage to the parts.

The inventors have recognized and appreciated techniques for depowdering that separate powder from parts through various mechanisms as described herein. These techniques may include, but are not limited to, the follow categories, which may be practiced independently or in combination.

According to some embodiments, techniques for depowdering described herein may include fabrication of auxiliary structures in addition to fabrication of parts. Certain auxiliary structures may aid with depowdering operations, and may be fabricated along with parts during an additive fabrication process. The auxiliary structures may be shaped and/or have positional and/or geometrical relationships to the parts during fabrication. For instance, an auxiliary structure may include a cage structure fabricated around one or more parts.

According to some embodiments, techniques for depowdering described herein may include modifying the behavior of regions of unbound powder arranged between regions of bound powder (e.g., parts) during fabrication. The behavior of these regions, referred to as "void spaces" herein, may be modified by depositing or otherwise providing additives to the powder in the regions during fabrication.

According to some embodiments, techniques for depowdering described herein may include modifications to the application of a binder fluid used to bind particles of a powder during additive fabrication. The modifications may include modifications to the physical composition of the binder fluid, and/or modifications to the manner in which the binder is deposited during fabrication.

According to some embodiments, techniques for depowdering described herein may include fabrication of depowdering support features. According to some embodiments, techniques for depowdering described herein may include rotating a mixture of parts and powder to separate the powder from the parts via centripetal force.

According to some embodiments, techniques for depowdering described herein may include applying a magnetic force to a mixture of powder and parts. In some cases, the powder and parts may each comprise a ferromagnetic material. Producing a magnetic field in proximity to the powder and parts (e.g., by placing one or more magnets) may attract the powder and parts, causing much greater movement of the powder due to its lower mass. In some cases, the properties of the powder used for additive fabrication may be augmented to enhance the effects of magnetic fields upon the powder and parts.

According to some embodiments, techniques for depowdering described herein may include applying an electrostatic force to a mixture of powder and parts. In some cases, a charge differential may be created between powder and a nearby surface, thereby creating an attractive force between the powder and surface and causing motion of the powder toward the surface.

Some techniques approaches described herein may mobilize powder and separate it from parts by utilizing the fact that powder is lighter and more movable than the parts embedded within it. While some green parts, such as green parts produced by binder jetting, may be fragile with respect to scraping or impacts, such parts may nonetheless be resistant to damage from motion produced by suitable forces, especially when the parts are cushioned by surrounding powder. Many of the techniques described herein for depowdering may be automated, as discussed further below, thereby mitigating the above-described challenges associated with manual depowdering operations.

According to some embodiments, techniques described herein for depowdering parts may be applied by a depowdering system that is separate from an additive fabrication device that fabricated the parts. This approach may provide advantages for throughput, since it may allow for an additive fabrication device to begin fabricating a second group of parts while a first group of parts is being depowdered. Moreover, in use cases in which additive fabrication takes more or less time than the subsequent depowdering step, multiple additive fabrication devices and/or depowdering systems may be employed to minimize downtime of the additive fabrication device(s) and depowdering system(s). For instance, in a simple case where additive fabrication takes half as long as depowdering, two depowdering systems could be operated in parallel so that the additive fabrication device and the two depowdering systems could be operated continuously to maximize throughput.

According to some embodiments, a depowdering system as described herein may be configured to receive a build box from an additive fabrication device and to perform depowdering on contents of the build box. As referred to herein, a "build box" includes any structure in which parts may be fabricated within a powder by an additive fabrication device, and that may be removed from the additive fabrication device subsequent to fabrication. In some embodiments, a depowdering system may be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering the subsection, metering another subsection, etc.

Irrespective of how a depowdering system may be configured to operate upon the contents of a build box, the depowdering system may be configured with a receptacle sized for the build box such that the build box can be removably mounted or otherwise removably attached to the depowdering system. Subsequent to depowdering, a build box may be removed from the depowdering system and reused for fabrication. At this stage in the process, the build box may, for instance, be empty or may contain only powder, depending on the particular type of depowdering operations performed as discussed below.

Reference is made herein to techniques in which depowdering operations are applied to parts embedded within powder. Generally, subsequent to excavation of such parts additional powder may still be adhered to the surface and additional depowdering may be necessary to produce a completely clean part. These two different types of depowdering are referred to herein as "coarse" and "fine" depowdering, wherein "coarse" depowdering broadly refers to excavating parts from powder and "fine" depowdering broadly refers to removing comparatively small amounts of powder from the surface of an excavated part. It will be appreciated that, the use of these terms notwithstanding, depowdering operations need not be rigidly categorized into purely coarse or purely fine depowdering operations. As such, these terms are used merely to aid description of the types of effects that may be produced by the techniques described herein, and should not be viewed as limiting.

Following below are more detailed descriptions of various concepts related to, and embodiments of, techniques for depowdering. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an additive fabrication system that includes a depowdering sub-system, according to some embodiments. System 100 includes an additive fabrication device 110, a depowdering system 120, a post-processing system 130 and computing device 105. System 100 may, for instance, represent the production pipeline for an additive fabrication technology in which parts are fabricated from a powder, examples of which may include binder jetting, direct metal laser sintering, direct laser melting or selective laser sintering. In general, any number of each of additive fabrication device 110, depowdering system 120 and post-processing system 130 may be included in such a pipeline, although a single instance of each will be discussed in relation to FIG. 1 for simplicity. As discussed above, a system that includes multiple devices at a given stage in the pipeline may provide for increased throughput by minimizing downtime of the devices in the pipeline.

In the example of FIG. 1, the additive fabrication device 110 may be configured to fabricate three-dimensional parts from one or more source materials. In particular, the additive fabrication device 110 may be configured to fabricate the parts from a powder or other granular source material. According to some embodiments, the source material may include a metal powder and/or a ceramic powder. Depending on the particular embodiment, a source material may for instance comprise a pure metal powder, a metal alloy powder, an intermetallic compound powder, one or more powder compounds containing at least one metallic element, and/or one or more ceramic powders. In some embodiments, the source material comprises pre-alloyed atomized metallic powders, a water or gas atomized powder, a mixture of a master alloy powder and an elemental powder, a mixture of elemental powders selected to form a desired microstructure upon the interaction of the elemental species (e.g., reaction and/or interdiffusion) during a post-processing step (e.g., sintering), one or more ceramic powders, and/or any other suitable materials. In some instances, the source material may comprise a sinterable powder, and/or the source material may be compatible with an infiltration process. Moreover, the source material may contain such wetting agents, flow improvers, coatings, and other powder modifications found to be useful in the sintering or infiltration of additively fabricated parts. Accordingly, it should be understood that the current disclosure is not limited to any particular material and/or combination of materials comprising the source material, nor is the current disclosure is limited to any particular type of additive manufacturing process.

As one non-limiting example of a suitable additive fabrication device 110, the additive fabrication device may include a material deposition mechanism which be operated to deposit source material onto a powder, and a print head which may be controlled to move across the powder to deliver liquid such as a binder onto the powder. In some cases, an additional device such as a roller may be operated to move over the deposited source material to spread the source material evenly over the surface. The print head may include one or more orifices through which a liquid (e.g., a binder) can be delivered from the print head to each layer of the source material. In certain embodiments, the print head can include one or more piezoelectric elements, and each piezoelectric element may be associated with a respective orifice and, in use, each piezoelectric element can be selectively actuated such that displacement of the piezoelectric element can expel liquid from the respective orifice.

In this illustrative embodiment of the additive fabrication device 110, the print head may be controlled (e.g., by computing device 105) to deliver liquid such as a binder onto a powder in predetermined two-dimensional patterns, with each pattern corresponding to a respective layer of a three-dimensional part. In this manner, the delivery of the binder may perform a printing operation in which the source material in each respective layer of the three-dimensional part is selectively joined along the predetermined two-dimensional layers. After each layer of the part is formed as described above, the platform may be moved down and a new layer of powder deposited, binder again applied to the new powder, etc. until the part has been formed.

In the example of FIG. 1, parts produced by the additive fabrication device 110 may be referred to as "green" parts since they must undergo subsequent processing to produce a final part. Moreover, the parts produced by the additive fabrication device 110 may be contained within a volume of powder or other granular material, necessitating their extraction by the depowdering system 120. Various embodiments of the depowdering system (and/or elements of the depowdering system 120) are discussed further below.

Post-processing system 130 may include one or more devices suitable for transforming an extracted green part into a final part, which may include one or more debinding devices and/or furnaces. In systems employing a binder jetting process, extracted green parts can undergo one or more debinding processes in the post-processing system 130 to remove all or a portion of the binder system from the parts. As such, post-processing system 130 may include a thermal debinding device, a supercritical fluid debinding device, a catalytic debinding device, a solvent debinding device, or combinations thereof. In some embodiments, post-processing system 130 may include a furnace. Extracted green parts may undergo sintering in the furnace such that particles of the powder (or other granular material) combine with one another to form a finished part. In some embodiments, a furnace may be configured to perform one or more debinding processes within the furnace while extracted green parts undergo sintering.

According to some embodiments, the production of parts by system 100 may be partially or fully automated. In particular, the system may be configured to move parts embedded within powder from the additive fabrication device 110 to the depowdering system 120, and/or may be configured to move parts from the depowdering system 120 to the post-processing system 130. Automated motion may comprise one or more robotics system and/or conveyor belts, which may be configured to move parts (or parts embedded within powder) between devices in system 100, which may include motion between the three stages 110, 120 and 130 depicted in FIG. 1 and/or may be configured to move parts internally to one of the stages (e.g., moving parts between two depowdering devices of depowdering system 120). Automated motion may include automated removal of a build box from a device and/or insertion of a build box into a device. For instance, in some embodiments a build box may be automatically removed from the additive fabrication device 110 and automatically moved to, and inserted into, a component of depowdering system 120.

In some embodiments, the additive fabrication device 110 may fabricate parts within a build box, which may be automatically transferred from the additive fabrication device to the depowdering system 120. Depowdering system 120 may, as discussed above, be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering it, metering another subsection, etc.

According to some embodiments, automated movement as described above may be controlled by computing device 105. In the example of FIG. 1, computing device 105 is provided as an illustrative example of a suitable controller that may be configured to control various automated operations of the additive fabrication device 110 and/or depowdering system 120. However, it will be appreciated that system 100 may also be operated by multiple separate computing devices, including standalone computing devices and/or computing devices installed within the additive fabrication device 110, depowdering system 120 or post-processing system 130. Such computing devices may or may not be coupled to one another. As such, it will be appreciated that the below discussion of the various computational tasks that computing device 105 may be configured to perform need not be implemented using a single computing device as shown, but could be implemented on any number of different computing devices, which may be located within, or separate from, any of the elements of system 100. In particular, some computational tasks may be implemented by one such computing device but not another so that different computing devices may be configured to perform different functions from one another.

According to some embodiments, computing device 105 may be configured to generate two-dimensional layers that may each comprise sections of an object. Instructions may then be generated from this layer data to be provided to additive fabrication device 110 that, when executed by the device, fabricates the layers and thereby fabricates the object. Such instructions may be communicated via a communication link 106, which may comprise any suitable wired and/or wireless communications connection. In some embodiments, a single housing may hold the computing device 105 and additive fabrication device 110 such that the link 106 is an internal link connecting two modules within the housing of the device.

According to some embodiments, computing device 105 may be configured to receive, access, or otherwise obtain instructions generated to cause the additive fabrication device 110 to fabricate one or more parts, and may execute said instructions, thereby causing the additive fabrication device to fabricate the one or more parts. For instance, the instructions may control one or more motors of the additive fabrication device 110 to move components of the device to deposit powder, deposit liquid binder onto a layer of the powder, etc.

According to some embodiments, computing device 105 may be configured to generate instructions that, when executed by the depowdering system 120, automatically performs depowdering operations, examples of which are described below. Such instructions may be communicated via a communication link 107, which may comprise any suitable wired and/or wireless communications connection.

In some embodiments, a single housing may hold the computing device 105 and depowdering system 120 such that the link 107 is an internal link connecting two modules within the housing of a device of the system.

In some embodiments, instructions to be executed by the depowdering system 120 may be generated based on the geometry of parts to be fabricated (or that were fabricated) by the additive fabrication device 120. As discussed further below, certain depowdering techniques may be based on, or may be improved by, removing powder from locations having a known relative location to parts within the powder. In some cases, instructions to be executed by the depowdering system 120 may be generated based on the locations of parts within the powder bed of the additive fabrication device 110 (or the expected locations after fabrication). As such, instructions to cause the additive fabrication device 110 to fabricate one or more parts may be generated by the computing device 105 as part of the same operation in which instructions are generated to be executed by the depowdering system 120. For example, computing device 105 may perform computational operations to arrange one or more parts to be fabricated within a three-dimensional volume representing the build volume of the additive fabrication device. The computing device 105 may then perform slicing of the parts in the volume and generate instructions for the additive fabrication device 110 to form successive layers of the parts, and in addition, may also generate instructions to be executed by the depowdering system based on the location and geometry of the parts within the volume.

As discussed above, a depowdering system may be perform depowdering on contents of a build box, either by directly depowdering parts within the build box while the parts are largely contained within the build box, or by metering contents of the build box into or onto an apparatus within the depowdering system. As examples of these two types of approaches, FIGS. 2A-2E depict illustrative operations that may be performed by a depowdering system to prepare the contents of a build box for depowdering operations, according to some embodiments.

In each of the examples of FIG. 2A-2E, some portion of a mixture of powder and parts is prepared for one or more depowdering operations. A mixture of powder and parts so prepared may be referred to herein as a "powder bed," irrespective of whether the mixture represents the entire contents of a build box or some subset of the contents of a build box, and irrespective of whether the mixture is held or supported by the build box or has been removed entirely from the build box. Accordingly, techniques described below as being applied to a powder bed may be understood as being applicable to any mixture of powder and parts, including but not limited to the various results of the operations of FIGS. 2A-2E.

Figure 2A:
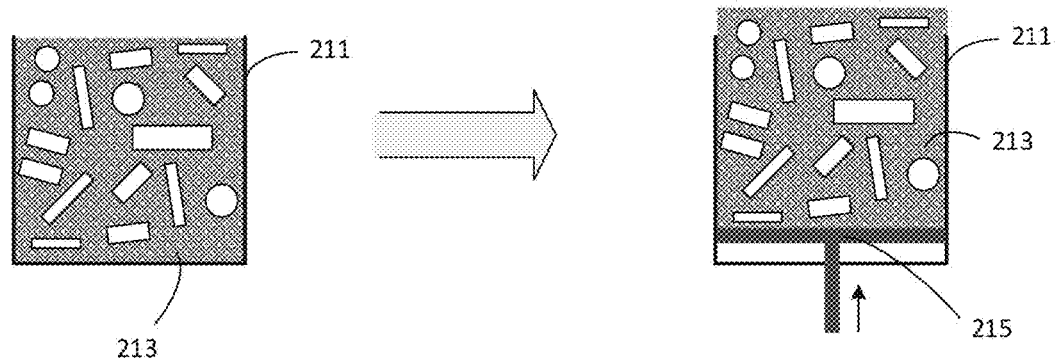
FIGS. 2A-2E depict illustrative operations that may be performed by a depowdering system to prepare the contents of a build box for depowdering, according to some embodiments.

In the example of FIG. 2A, a build box 211 initially comprises a mixture of powder and parts 213. Subsequently, a bottom surface of the build box is pushed upward by a delivery mechanism 215, which causes an upper section of the mixture of powder and parts 213 to be pushed beyond the upper edges of the build box. According to some embodiments, the build box 211 may comprise a plate arranged over the bottom of the build box onto which the powder and parts may be deposited. The delivery mechanism 215 may then engage with the plate and push it upwards within the build box. Alternatively, the bottom of the build box may be movable and the delivery mechanism 215 may engage with the bottom of the box and push it upwards.

Figure 2B:
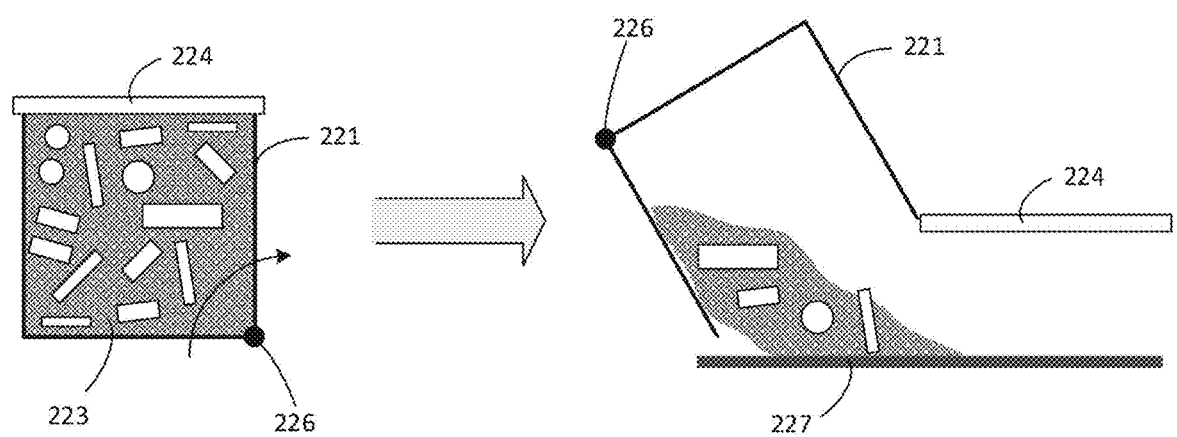

In the example of FIG. 2B, a build box 221 initially comprises a mixture of powder and parts 223 and has a cover 224 over the contents of the build box. Subsequently, the build box may be rotated around axis 226 and the lid may be automatically opened, thereby spilling contents of the build box 221 onto a desired surface 227.

Figure 2C:
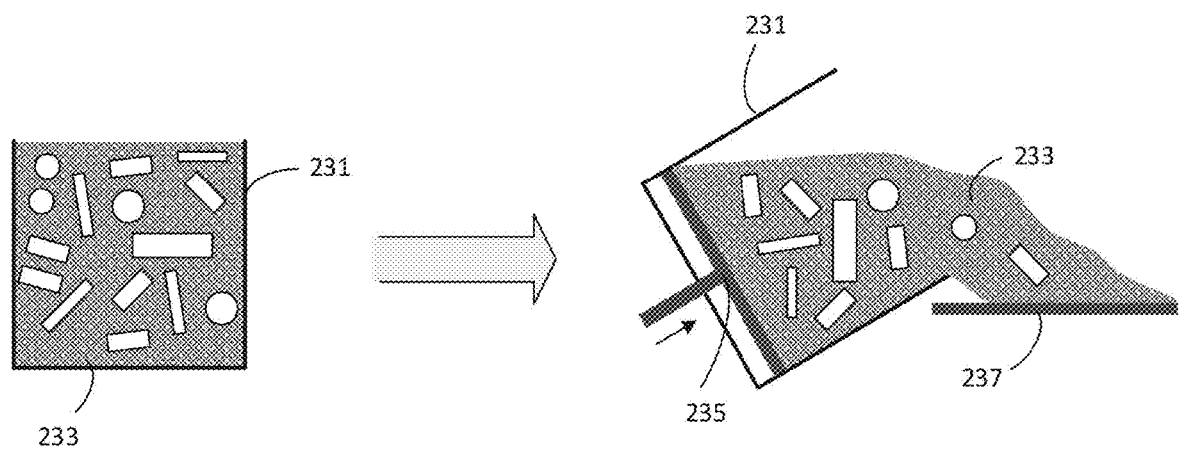

In the example of FIG. 2C, a build box 231 initially comprises a mixture of powder and parts 233. Subsequently, a bottom surface of the build box is pushed upward by a delivery mechanism 235, which causes an upper section of the mixture of powder and parts 233 to be pushed beyond the upper edges of the build box. Simultaneously, the build box is rotated, the combination of which cause contents of the build box to spill onto a desired surface 237. According to some embodiments, the build box 231 may comprise a plate arranged over the bottom of the build box onto which the powder and parts may be deposited. The delivery mechanism 235 may then engage with the plate and push it upwards within the build box. Alternatively, the bottom of the build box may be movable and the delivery mechanism 235 may engage with the bottom of the box and push it upwards.

Figure 2D:
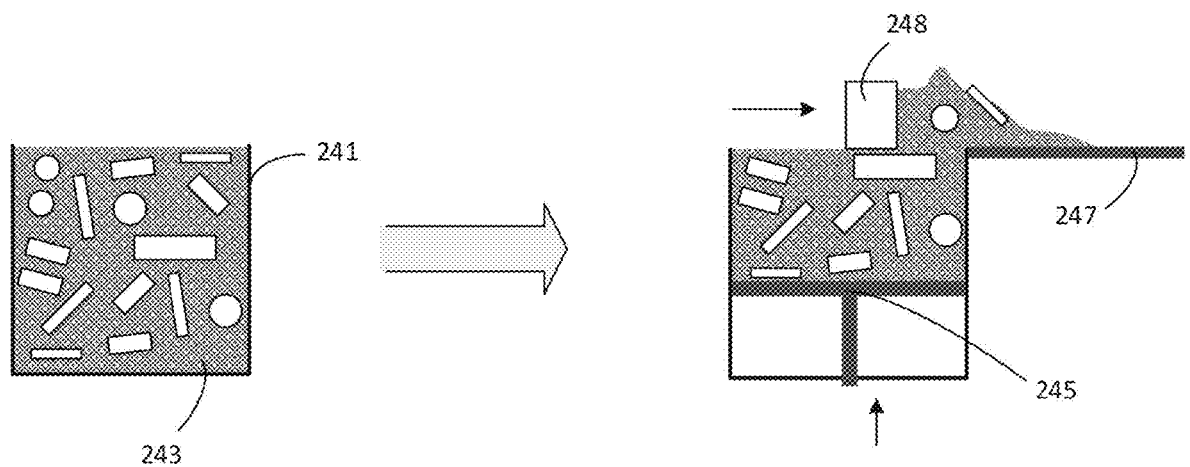

In the example of FIG. 2D, a build box 241 initially comprises a mixture of powder and parts 243. Subsequently, a bottom surface of the build box is pushed upward by a delivery mechanism 245, which causes an upper section of the mixture of powder and parts 243 to be exposed above the upper edges of the build box. Simultaneously or subsequently, a scraper 248 is moved over the surface of the build box, pushing the exposed powder and/or parts onto an adjacent surface 247. The scraper may for instance be wider than the box build and coupled to one or more actuators configured to move the scraper over the opening of the build box. According to some embodiments, the build box 241 may comprise a plate arranged over the bottom of the build box onto which the powder and parts may be deposited. The delivery mechanism 245 may then engage with the plate and push it upwards within the build box. Alternatively, the bottom of the build box may be movable and the delivery mechanism 245 may engage with the bottom of the box and push it upwards.

Figure 2E:
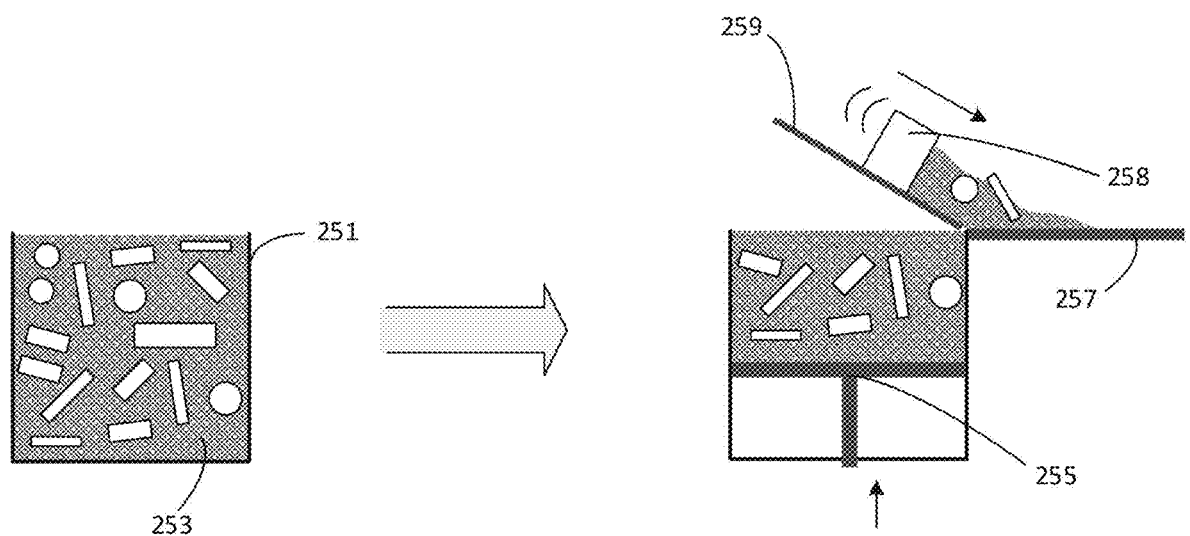

In the example of FIG. 2E, a build box 251 initially comprises a mixture of powder and parts 253. Subsequently, a bottom surface of the build box is pushed upward by a delivery mechanism 245, which causes an upper section of the mixture of powder and parts 243 to be exposed above the upper edges of the build box. Simultaneously or subsequently, a plate 259 is inserted into the exposed mixture of powder and parts and raised to incline the mixture on the plate 259. Simultaneously with insertion or inclination of the plate 259, or subsequently, scraper 258 is moved along the plate 259 to push the separated portion of the mixture 253 onto surface 257. In some cases, the plate 259 may be vibrated to aid the mixture of powder and parts to slide down the include onto surface 257. According to some embodiments, the build box 251 may comprise a plate arranged over the bottom of the build box onto which the powder and parts may be deposited. The delivery mechanism 255 may then engage with the plate and push it upwards within the build box. Alternatively, the bottom of the build box may be movable and the delivery mechanism 255 may engage with the bottom of the box and push it upwards.

In each of the examples of FIGS. 2A-2E, where components are described above as being moved, said motion may comprise, in each individual case, any combination of manual and/or automated motion. Automated motion may include execution of instructions by a suitable computing device to operate one or more components of the depowdering system 120, such as one or more actuators, to produce motion and/or may include motion produced by a user manually interacting with the depowdering system 120 (e.g., presses a button), which then automatically operates the one or more components of the depowdering system 120 to produce motion.

For the various depowdering techniques described below, some may be practiced upon a mixture of powder and parts within a container, which may be, though is not limited to, the build box itself. In cases where the techniques are practiced upon a mixture of powder of parts in a container that is not the build box, any of the techniques described above in relation to FIGS. 2A-2E may be performed prior to depowdering while transferring powder and parts from the build box into the container. In techniques described below in which one step in the depowdering process is to remove material from the build box (or another container), any of the techniques described above in relation to FIGS. 2A-2E may be performed in removing the material (e.g., the step shown in FIG. 4B may comprise any of the techniques of FIGS. 2A-2E).

Figure 3B:
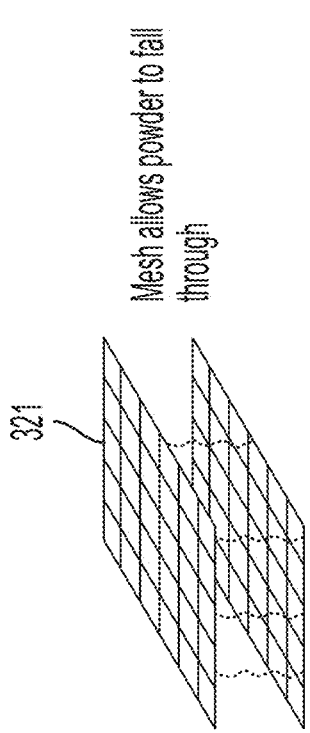
FIGS. 3A-3D depict an illustrative example of fabrication of auxiliary structures comprising a sifting tray, according to some embodiments.
Figure 3C:
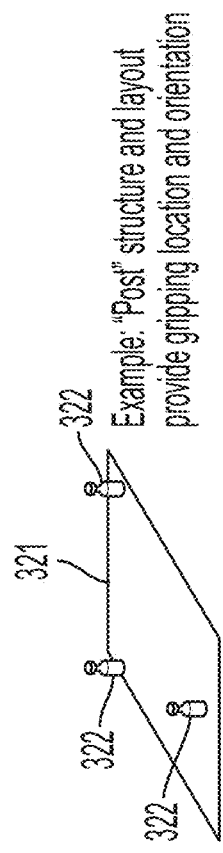
Figure 3D:
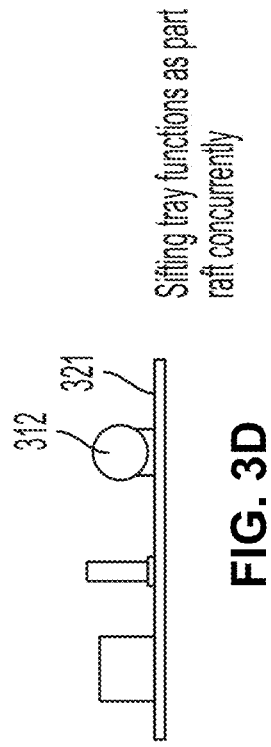
Figure 3A:
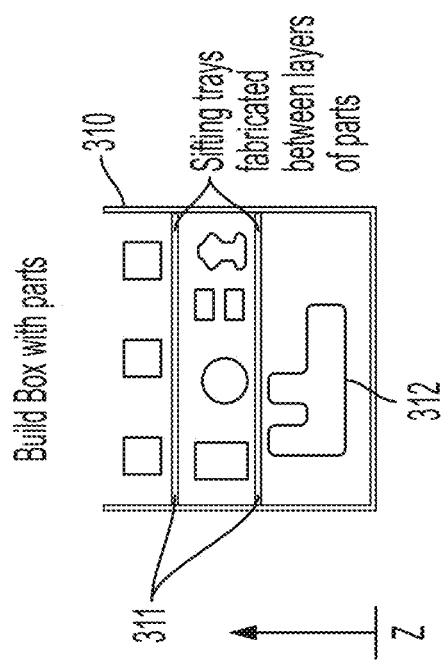

FIGS. 3A-3D depict an illustrative example of fabrication of auxiliary structures comprising a sifting tray, according to some embodiments. As shown in FIG. 3A, a build box 310 (shown in cross section) may comprise one or more sifting trays 311 that are fabricated in addition to parts 312. The sifting tray(s) may be fabricated in the same manner as the parts; for instance, the parts and the sifting tray(s) may be fabricated via a binder jet process. As shown in FIG. 3A, the parts 312 may be organized into layer groups and separated in the vertical direction (z-axis) by sifting trays. The sifting trays are disposable trays that can aid in depowdering as discussed below.

FIG. 3B depicts an example of the structure of a sifting tray in an isometric view. As shown, the sifting tray 321 comprises a plurality of perforations through which powder can fall. The perforations may be fabricated to be smaller than the parts so that powder is able to pass through the perforations but parts are not. In some embodiments, a sifting tray may be configured such that its perforations are smaller than the smaller part in the layer group directly above the sifting tray. As such, in some cases two different sifting trays fabricated in the build box might have different respective perforation sizes.

FIG. 3C depicts an example of sifting tray 321 that includes handles 322 to aid with gripping and/or reorienting the tray. FIG. 3D depicts use of the sifting tray as a raft, wherein the parts within a layer group are fabricated in close proximity to the tray which can thereby function as a raft.

Figure 4A:
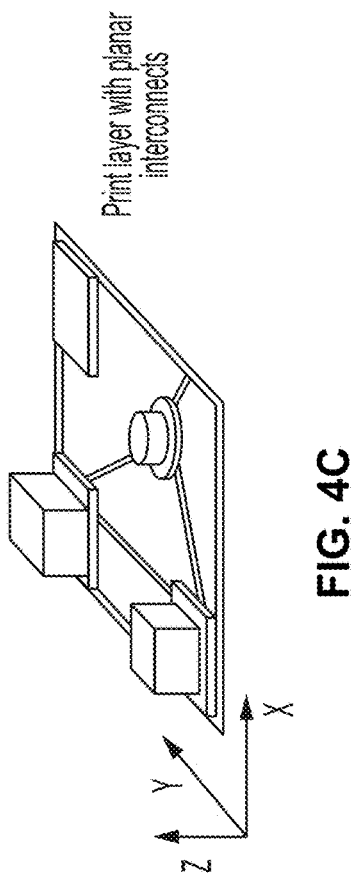
FIGS. 4A-4D depict an illustrative example of fabrication of auxiliary structures comprising networked build supports, according to some embodiments.
Figure 4B:
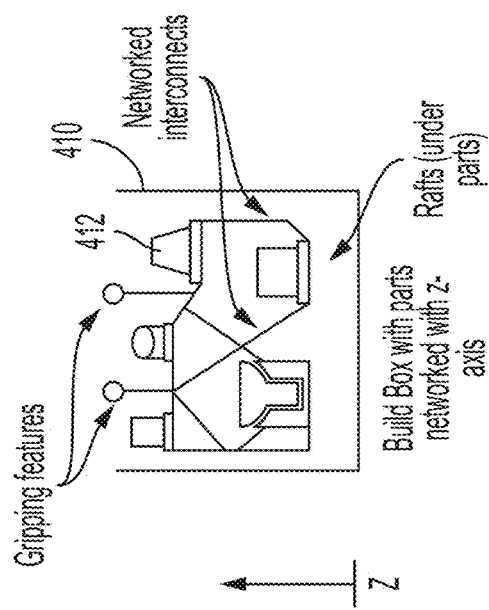
Figure 4C:
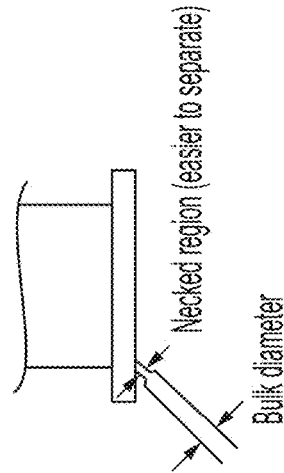
Figure 4D:
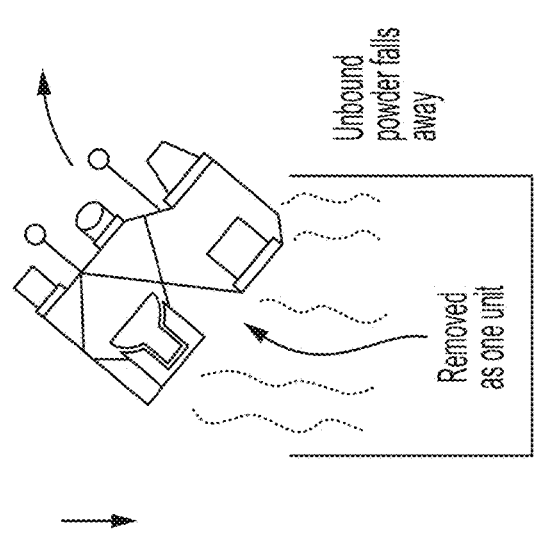

FIGS. 4A-4D depict an illustrative example of fabrication of auxiliary structures comprising networked build supports, according to some embodiments. In the example of FIGS. 4A-4D, support structures of fabricated parts are fabricated to interconnect to form a network such that multiple parts may be connected together via their support structures. During depowdering, fewer objects need to be manipulated which may allow depowdering to occur more quickly. For instance, sources of potential damage to parts may be more easily removed during depowdering. The support structures may be designed to be easily removed, such as by minimizing the contact surface area between the support structure and the part (e.g., by narrowing the structure at the point of contact as shown in FIG. 4D). Any residual support material can be subsequently removed from the part using sandpaper or another other abrasive technique.

In FIG. 4A, a build box 410 comprises parts 412 and powder (not shown). The parts are fabricated on respective rafts and/or support structures, which are interconnected with filamentary interconnect structures. In FIG. 4B, the combination of parts, rafts and/or support structures, and interconnect structures, can be removed as a single unit, allowing unbound powder to fall freely from the parts. In some cases, a layer of parts may be fabricated with planar interconnects as shown in FIG. 4C.

FIGS. 5A-5E depict an illustrative example of fabrication of auxiliary structures comprising gripping features, according to some embodiments. In the example of FIGS. 5A-5E, parts are fabricated in contact with one or more gripping features, which are structures arranged with a particular geometry to interact with a gripping tool. For instance, as shown in FIG. 5B, a raft structure may be fabricated with a notch feature sized for a robotic clamp to align and fit into the notch when clamping around the raft, as shown in FIG. 5A.

A gripping tool may be manually operated and/or may be part of an automation system which includes computer vision to identify the geometry of the part and/or coupled auxiliary structures, and operates a robotic gripper to grab the feature of the auxiliary structure to translocate the part. In some cases, a gripping feature may include one or more clocking features allowing the part's orientation to be determined. For instance, the notch and gripper shown in FIG. 5C may align so that the orientation of part 522 is known after the raft 523 is gripped. FIG. 5D depicts a gripping post which may be suitable for some gripping tools; FIG. 5E depicts a fabricated triangular raft coupled to three gripping posts that may be gripped by a suitable tool.

Figure 6B:
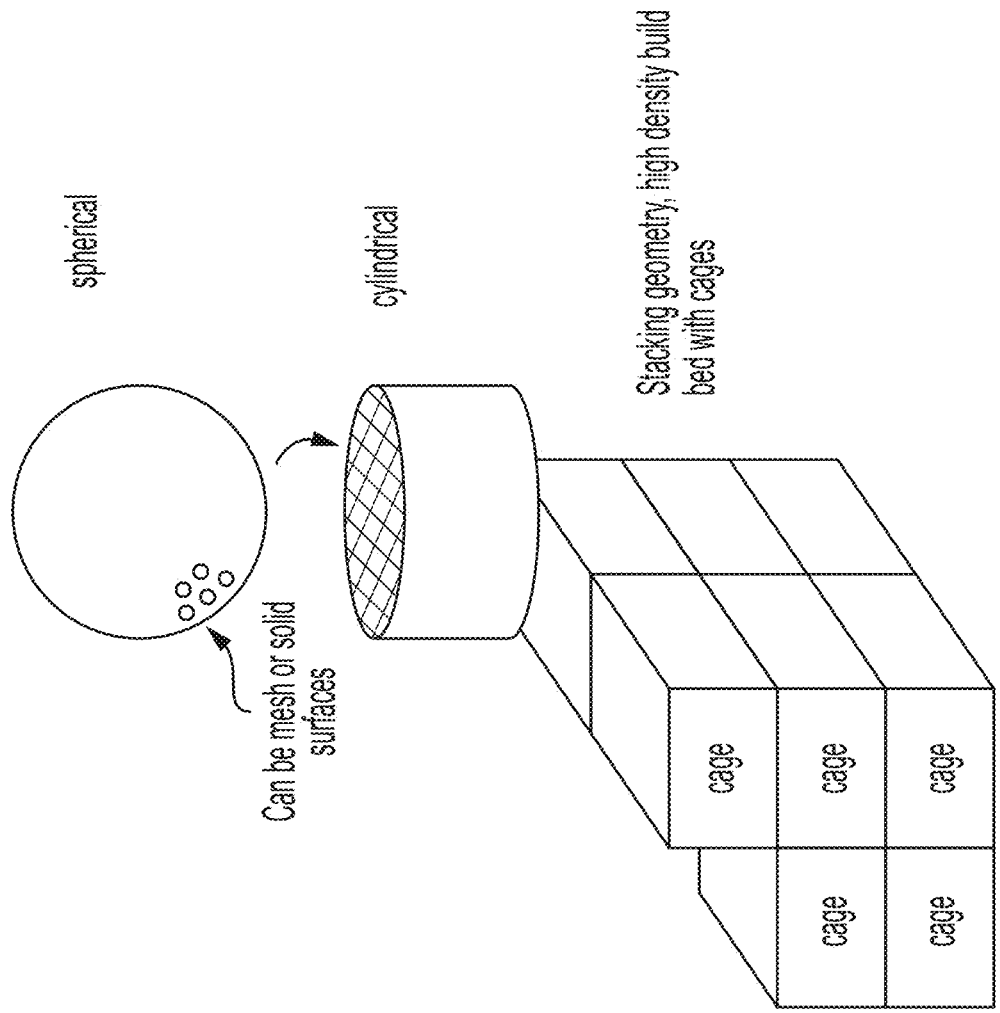
FIGS. 6A-6B depict an illustrative example of fabrication of auxiliary structures comprising a part cage, according to some embodiments.
Figure 6A:
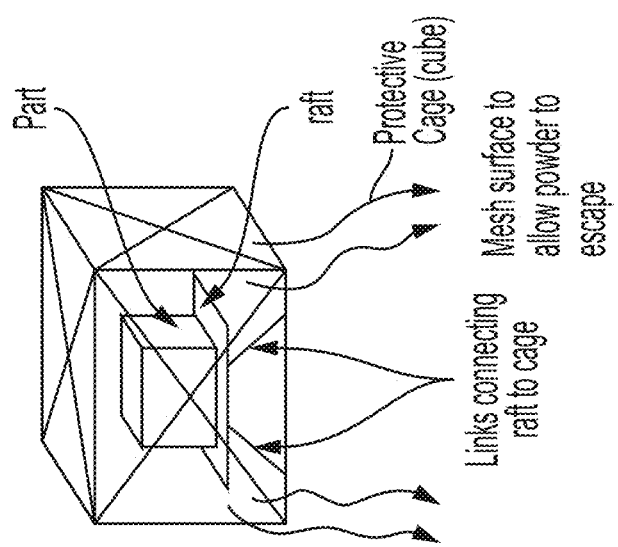
Figure 7C:
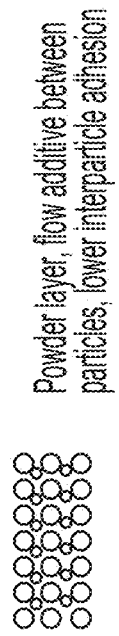
FIGS. 7A-7D depict an illustrative example of modifying voids between parts by depositing a flow additive, according to some embodiments.
Figure 7D:
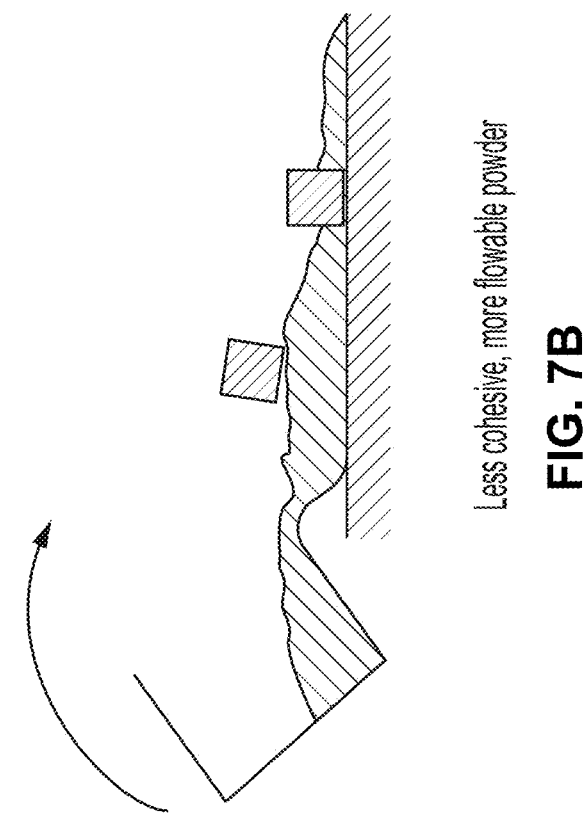
Figure 7A:
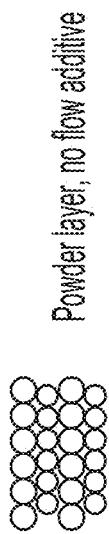
Figure 7B:
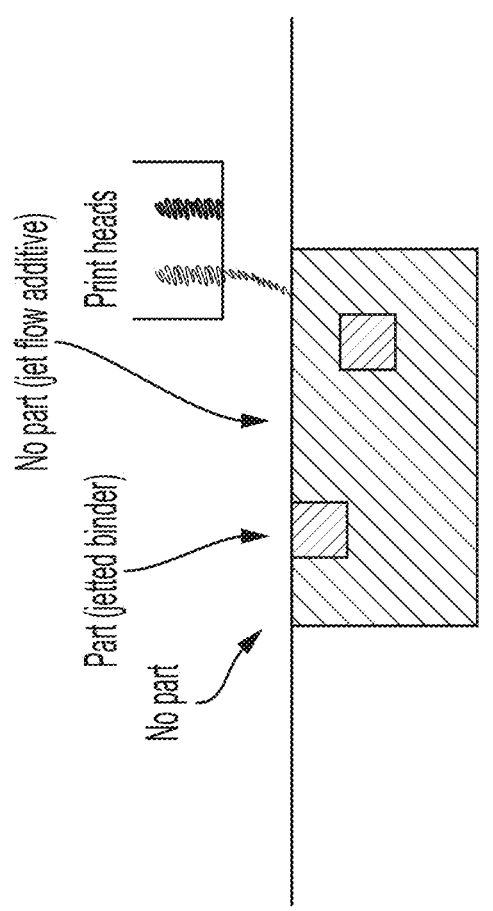

FIGS. 6A-6B depict an illustrative example of fabrication of auxiliary structures comprising a part cage, according to some embodiments. In the example of FIGS. 6A-6B, a protective but sacrificial "cage" or "shell" is fabricated around one or more parts for the purpose of increasing durability of the part for depowdering. As discussed above, depowdering can be slow because the parts are delicate, fine, and buried within an opaque powder bed. The part cage may simplifies the geometry and provide a sacrificial layer that can be damaged such that depowder techniques can be rougher and thus quicker.

In some cases, the contents of the build box can be poured onto a vibrating sieve to remove the coarse powder; because of the cage, there is no concern for damaging parts from rubbing or collision so a quicker method such as that can be used. The cage may be configured to be easily removable without damage to the part itself in the process. The cage design can serve many other purposes as well. The cage can be spherical or have flat sides to aid mobility, stability, orientation, and transport. The cage can have a "mesh surface" that allows powder to pass through for increased depowdering or solid surface which maintains a cushioning barrier of powder within the shell. The shell can have integrated grippable features as mentioned previously in relation to FIGS. 5A-5E for aid in transport.

As discussed above in relation to FIG. 1, a computing system 105 may generate instructions for additive fabrication device 110 to fabricate parts. In the case of auxiliary structures, including but not limited to the illustrative auxiliary structures described above, the computing system 105 may also generate instructions to fabricate the auxiliary structures (such as the sifting tray(s) of FIGS. 3A-3D). A 3-dimensional representation of the auxiliary structure(s) may be generated by the computing device 105 according to user input provided by a user, and/or through automated processes executed by the computing device to generate the structure(s) based on the position of the parts to be fabricated within the build box.

FIGS. 7A-7D depict an illustrative example of modifying voids between parts by depositing a flow additive, according to some embodiments. In the example of FIGS. 7A-7D, a flow improver (e.g., a liquid and/or a particle suspension) may be deposited during fabrication to improve flow characteristics of the powder. In some cases, the flow improver may be deposited only onto regions of the powder onto which a binder fluid is not deposited; as such, powder is either bound to form a part, or is intended to remain as powder and a flow improver is deposited onto it. One example of a suitable material is $SiO_2$, fumed silica.

To provide the flow improver, an additive fabrication device may comprise at least two different print heads, which are configured to deposit binder fluid and flow improver, respectively. As the print head moves over the surface of the powder, binder fluid or flow improver may be deposited onto selected regions of the powder according to the positions of slices of the parts in a given layer.

Figure 8B:
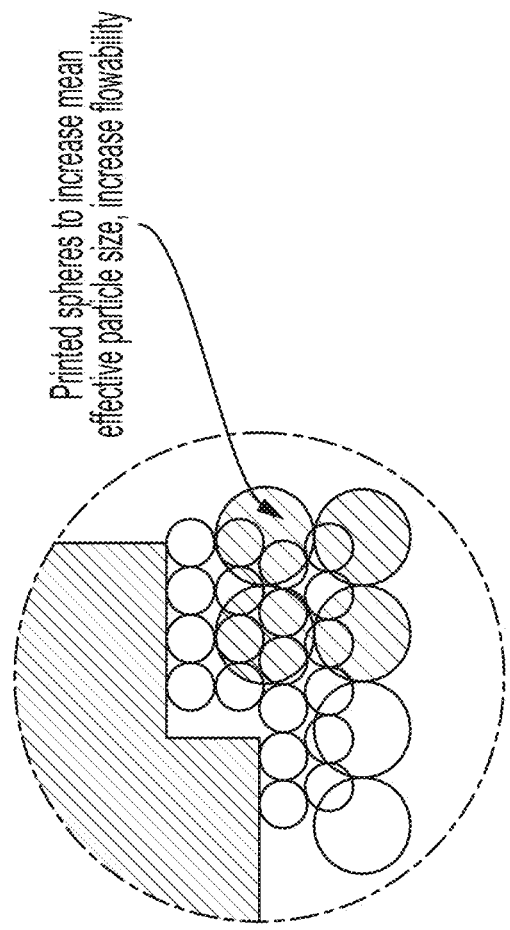
FIGS. 8A-8B depict an illustrative example of modifying voids between parts by forming flowability structures, according to some embodiments.
Figure 8A:
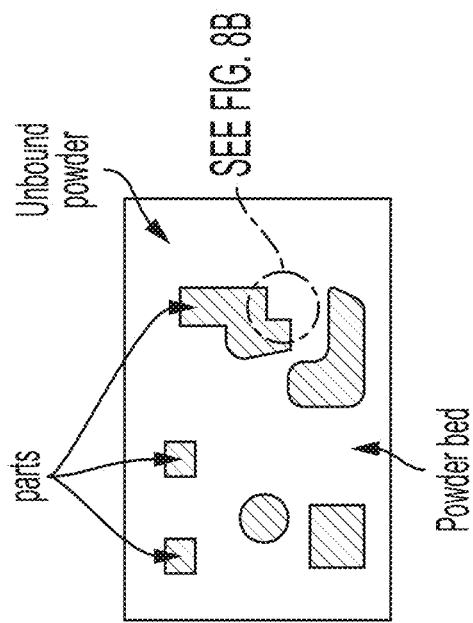

FIGS. 8A-8B depict an illustrative example of modifying voids between parts by forming flowability structures, according to some embodiments. In the example of FIGS. 8A-8B, additional structures may be formed in void spaces between parts during fabrication to aid in flowability of the powder. In some cases, these structures may comprise spheres, referred to herein as "flowability spheres." The flowability spheres may be significantly larger than the powder particle diameter (e.g., 5-10 times) and may be formed in the same manner as the parts, but may be considered disposable as their purposes is to increase the bulk flowability of the powder by reducing cohesion between particles of the powder.

FIGS. 9A-9D depict an illustrative example of modifying voids between parts by forming powder containers, according to some embodiments. In the example of FIGS. 9A-9D, spaces between parts may be transformed into structures that contain both unbound powder and a part to make the part easier to handle. In some cases, the "container" structure may be formed by jetting a thin shell of the binder fluid around the part to encapsulate the unbound powder and the part. The containers may be arranged so as to not lock in features of the parts. After the parts within containers have been depowdered, the containers may be broken to release the trapped unbound powder, which can in at least some cases be recycled in future fabrication.

As discussed above in relation to FIG. 1, a computing system 105 may generate instructions for additive fabrication device 110 to fabricate parts. In the case of modification of voids, including but not limited to the illustrative techniques described above, the computing system 105 may also generate instructions to produce the modified void region (e.g., to jet a flow modifier from an alternative print head, to form flowability spheres, etc.). In the case of additional structures being formed within void regions (e.g., flowability spheres, part containers, etc.), a 3-dimensional representation of the additional structures(s) may be generated by the computing device 105 according to user input provided by a user, and/or through automated processes executed by the computing device to generate the structure(s) based on the position of the parts to be fabricated within the build box.

Figure 10A:
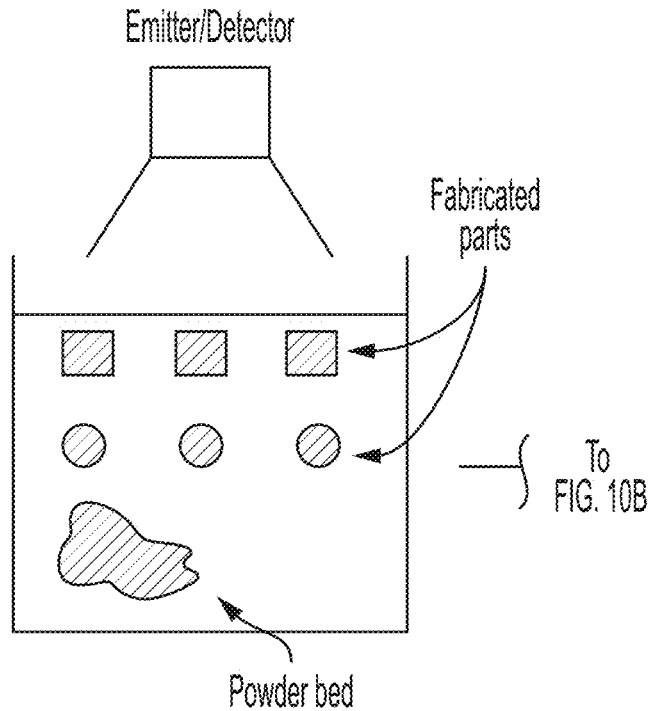
FIGS. 10A-10B depict an illustrative example of modifying a process of binder fluid deposition by depositing a marker within the binder, according to some embodiments.
Figure 10B:
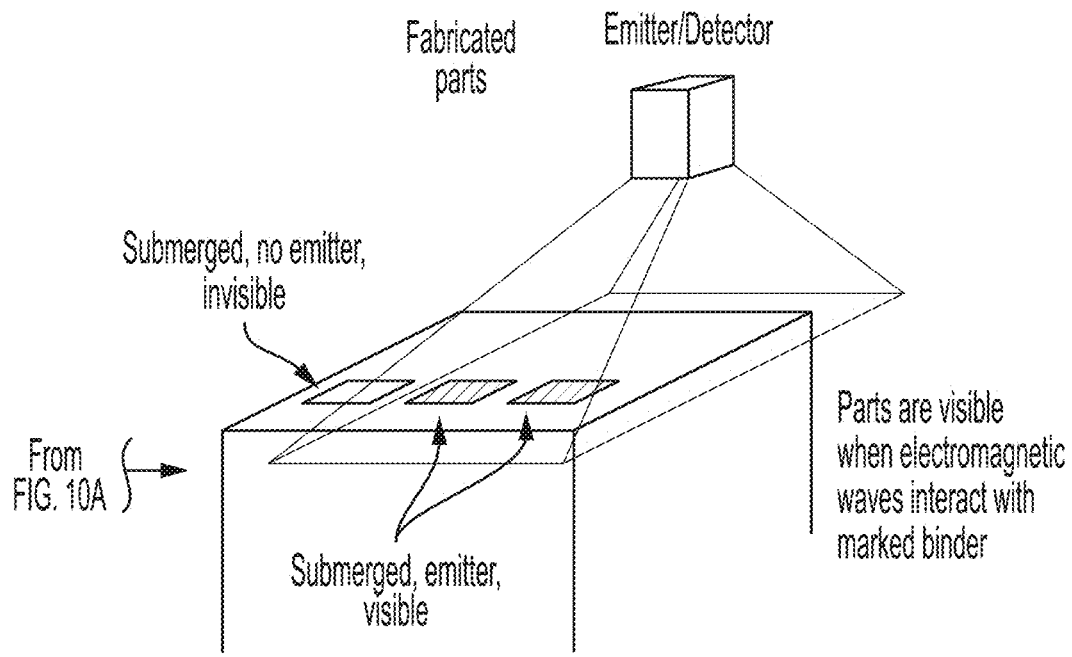

FIGS. 10A-10B depict an illustrative example of modifying a process of binder fluid deposition by depositing a marker within the binder, according to some embodiments. In the example of FIGS. 10A-10B, parts are fabricated using a binder that includes a marker. The marker may include color dyes, fluorescent dyes, radioactive materials, and/or any materials that react to or reflect electromagnetic radiation differently that the bulk powder (i.e., powder without the binder). The marker may allow the parts to be detected and identified within the build box, making their removal from the build box easier.

Figures 11A, 11B:
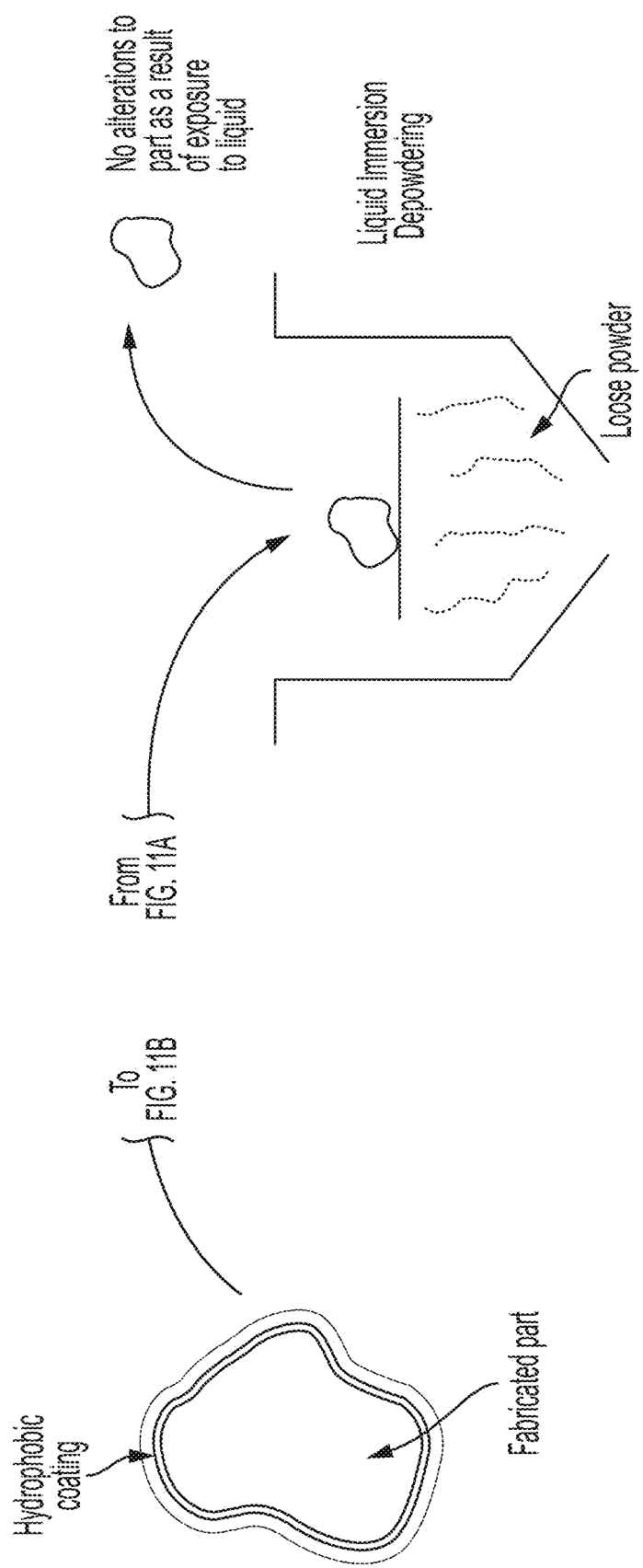
FIGS. 11A-11B depict an illustrative example of modifying a process of binder fluid deposition by depositing a hydrophobic coating, according to some embodiments.

FIGS. 11A-11B depict an illustrative example of modifying a process of binder fluid deposition by depositing a hydrophobic coating, according to some embodiments. In the example of FIGS. 11A-11B, a hydrophobic additive and/or hydrophobic binder is deposited onto the outer surface of parts during fabrication. For instance, a hydrophobic liquid may be deposited on and/or close to, the edges of regions of powder on which binder fluid is deposited during fabrication. During subsequent depowdering operations in which the parts are submerged in a liquid, the hydrophobicity of the deposited material on the outer surface(s) of the parts may inhibit or prevent the liquid from infiltrating the parts and/or swelling the binder fluid. Liquid immersion depowdering may for instance include any of the techniques described in U.S. Application No. 62/890,921, filed on Aug. 23, 2019, which is incorporated herein by reference in its entirety. Suitable hydrophobic coating materials may include a dispersion of one or more hydrophobic polymers (e.g., PTFE, polyethylene, waxes) in one or more volatile solvents (e.g., fluorinated fluids) and/or one or more non-volatile hydrophobic fluids (e.g., oil, silicone fluid).

Figures 12A, 12B:
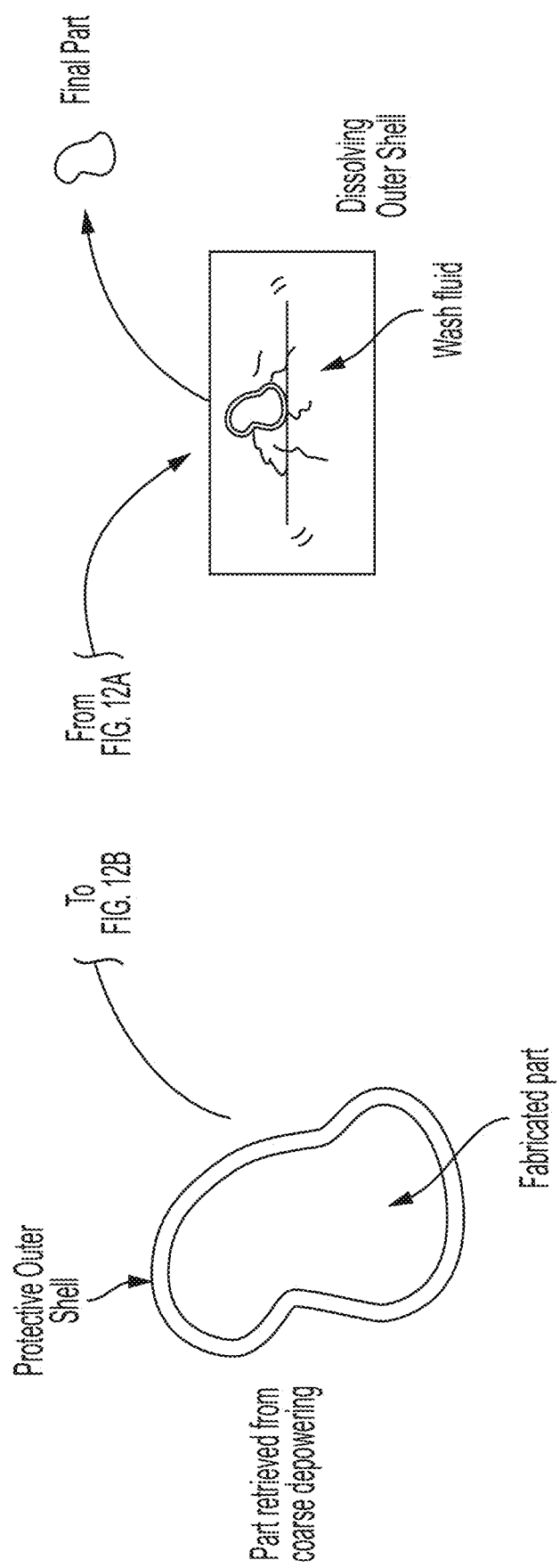
FIGS. 12A-12B depict an illustrative example of modifying a process of binder fluid deposition by forming a soluble shell around parts, according to some embodiments.

FIGS. 12A-12B depict an illustrative example of modifying a process of binder fluid deposition by forming a soluble shell around parts, according to some embodiments. In the example of FIGS. 12A-12B, during fabrication a shell is formed around a part using a binder that has a different solubility than the binder used to form the part. During subsequent depowdering operations in which the part is submerged in a liquid (e.g., liquid immersion depowdering as mentioned above), the liquid may dissolve the shell around the part, thereby revealing the part.

In some embodiments, the shell may simply have a faster dissolution rate than the binder used to create the part. The shell may be dissolved by a fluid that is inert to the binder used to create the part, or the shell may have a differential expansion rate relative to the binder used to create the part. For example, the shell may be formed from a binder comprising small carbohydrates such as sucrose and glucose, which can be dissolved during depowdering. As another example, the shell may be formed from a binder comprising a silicone liquid, rosin, and/or hydrocarbon wax; the shell may then be dissolved in a fluid such as hexane. In some embodiments, the shell may swell when submerged in a suitable liquid (instead of, or in addition to, dissolving). For example, the binder used to form the shell may comprise a carbomer like polyacrylic acid, which swells in a basic solution.

FIGS. 13A-13D depict an illustrative example of modifying a process of binder fluid deposition by forming an activated-release support shell, according to some embodiments. In the example of FIGS. 13A-13D, during fabrication a shell is formed around a part using a binder that comprises a material which can be activated using electromagnetic waves (whereas the parts are formed using the usual binder). Subsequent to fabrication, suitable electromagnetic waves may be directed to the part, thereby activating the binder in the shell causing it to heat and either crack and/or sublimate. In either case, activating the shell binder may eject the shell from the part. The activation frequency of the shell may be chosen to be sufficiently different from any absorption frequencies of the binder to avoid similar effects on the part itself. The shell may protect the part for coarse depowdering and as such may act in place of fine depowdering.

FIGS. 14A-14C depict an illustrative example of removing support features, according to some embodiments. In the example of FIGS. 14A-14C, a part may be fabricated connected to another structure, such as a raft or other support feature. Examples of such structures are discussed above (e.g., supports that are networked together, supports with grippable features, etc.). FIG. 14A depicts an illustrative part 1411 coupled to a support 1412. In general, a support coupled to a part with this structure may be difficult to remove without damage to the part and/or without leaving portions of the support attached to the part.

A modified support 1422 coupled to part 1411 as shown in FIG. 14B comprises a through hole such that a supplied gas can apply pressure between the support and the part to assist with the removal of the support. In some cases, the through hole may branch within the support to multiple exit holes on the opposite side to increase the pushing force. The port on the free side may be augmented with a printed "quick connect" feature which provides a reliable interface and method of gripping the support while pressure is applied.

Figure 15C:
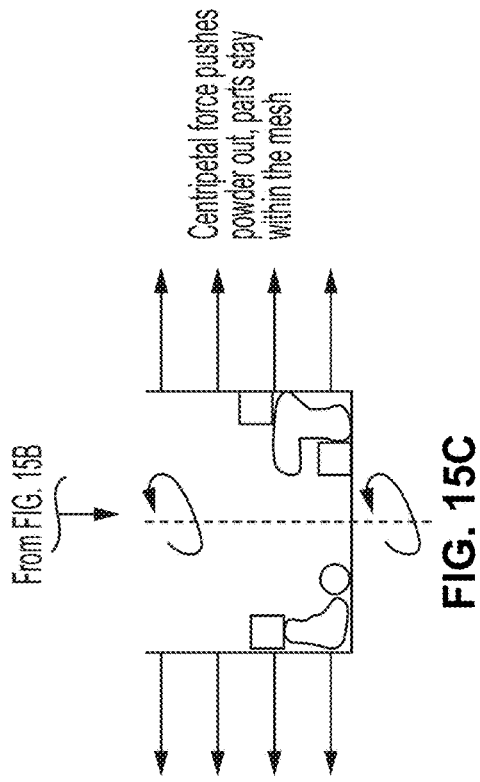
FIGS. 15A-15C depict an illustrative example of applying a centripetal force to one or more parts by rotating a container, according to some embodiments.
Figure 15B:
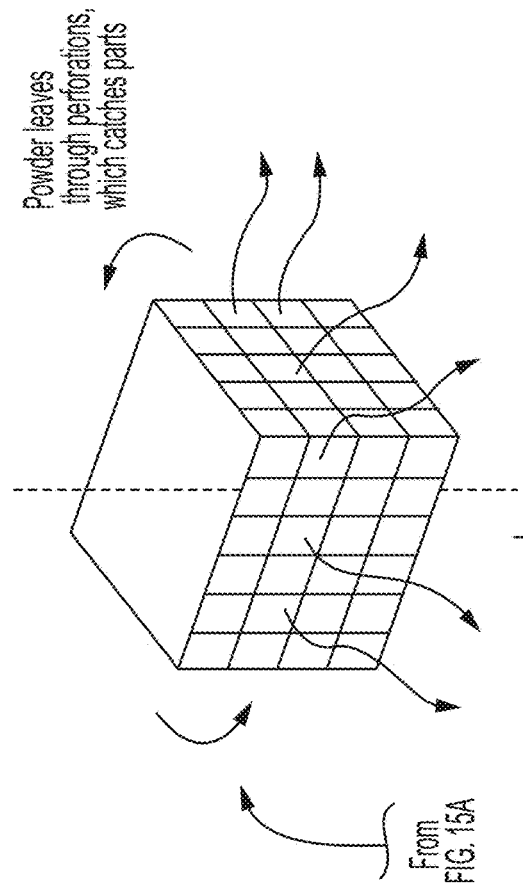
Figure 15A:
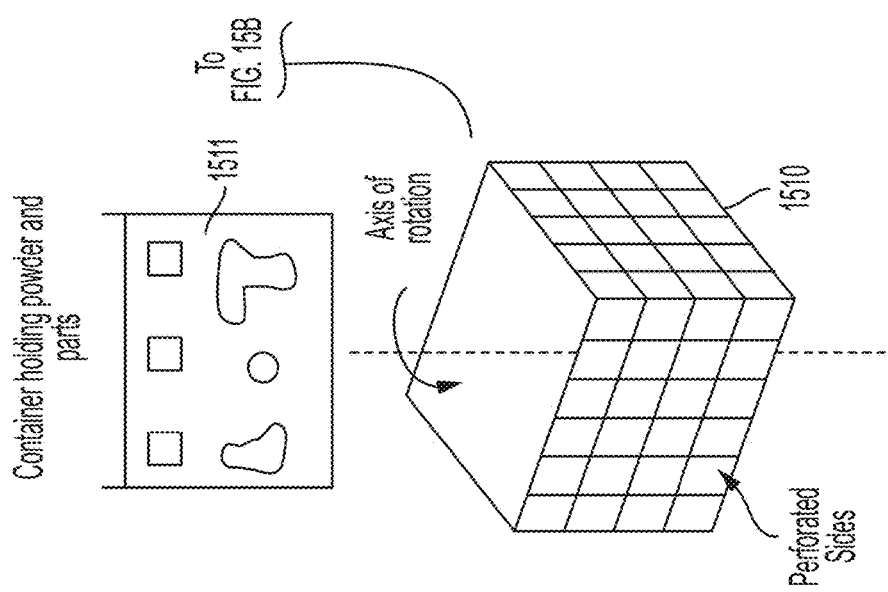

FIGS. 15A-15C depict an illustrative example of applying a centripetal force to one or more parts by rotating a container, according to some embodiments. In the example of FIGS. 15A-15C, an illustrative container 1510 comprises a mixture of powder and parts 1511. The container comprises a plurality of perforations and may be mounted to a suitable apparatus which can be operated to rotate the container around an axis. Rotation of the container causes the parts and powder to be pushed outwards from the container, allowing powder to pass through the perforations while retaining the parts.

The container may be accelerated to at least an angular velocity where centripetal acceleration dislodges powder from the printed part and exits through the perforations along the circumference of the container. An air manifold at the center axis of rotation may be applied to mobilize powder on surfaces normal to the centripetal force that would otherwise be unaffected by the centripetal force. The container could have any geometry including cuboid or cylindrical. In some cases, the container may be the build box from the additive fabrication device.

FIGS. 16A-16C depict an illustrative example of applying a centripetal force to one or more parts by rotating the part(s), according to some embodiments. In the example of FIGS. 16A-16C, a part (having been previously coarsely depowdered) may be fixtured in a device with at least one axis of rotational freedom. The device may be operated to spin with enough angular velocity for centripetal forces to overcome powder cohesion and dislodge unbound powder on the surface of the printed part. In some cases, the device may mount the part using a printed feature on the part and/or an associated support such that fine depowdering is not necessary at the fixture point. In some embodiments, the device may be configured to rotate around multiple axes of rotation, such as a gyroscope.

FIGS. 17A-17B depict an illustrative example of applying a magnetic force to a mixture of powder and parts, according to some embodiments. In the example of FIGS. 17A-17B, a magnetic source, such as a permanent magnet, electromagnet, etc. may be placed in proximity to a fabricated part covered in unbound ferromagnetic powder. The ferromagnetic powder will be attracted to the magnetic field produced by the magnetic source, and in particular, unbound powder will respond more easily due to having a lower mass. In some cases, the magnetic source may be moved past the part in multiple passes to yield a depowdered part. In some embodiments, air and vibration assistance can be used to aerate and eject powders into range of the magnetic field, as shown in FIG. 17A. The magnetic source may comprise a non-magnetic but permeable material on its surface (or otherwise between the magnetic source and the powder) such that the unbound powder attracted to the magnet can be transported and easily cleaned from the device after depowdering.

FIGS. 18A-18D depict an illustrative example of applying a magnetic force to a mixture of powder and parts, according to some embodiments. FIGS. 18A-18B depict an example of directing air onto a build box, showing how the powder can recoat the surfaces of the parts and build box in the absence of any other forces. In the example of FIGS. 18C-18D, a pair of magnets are placed close to the build box and act as magnetic "filters" in that they mitigate recoating by attracting or filtering aerated powder against a surface as described above in relation to FIGS. 17A-17B. This helps with preventing recontamination which increases efficiency and effectiveness of depowdering.

FIGS. 19A-19D depict an illustrative example of applying a magnetic force to ferromagnetic binder, according to some embodiments. In cases where the powder from which parts are fabricated is not ferromagnetic, a ferromagnetic material may be deposited during fabrication to produce attraction between a magnetic source and the ferromagnetic material to aid depowdering. In some cases, as shown in FIGS. 19A-19B, a ferromagnetic ink may be deposited into a non-ferrous metal powder where parts are not present. The result is non-ferrous metal parts arranged within a ferromagnetic powder, allowing the powder to be attracted to a magnetic source and removed. In some cases, as shown in FIGS. 19C-19D, a ferromagnetic binder is used to form parts, so that the parts may be moved away from the non-ferrous powder via a magnetic source. These techniques may be particularly useful for materials which have no iron in them and are relatively inert to magnetic forces, such as silver, titanium or gold.

FIGS. 20A-20C depict an illustrative example of applying a magnetic force to powder and/or parts while avoiding powder from contaminating the magnetic source, according to some embodiments. Powder attracted and stuck to the surface of a magnet may for instance, decrease the recycled powder yield and decrease the effectiveness of the magnet. As a result, it is desirable that a magnetic source is able to be cleared of unbound powder and/or parts. As shown in FIGS. 20A-20C, by placing a non-ferrous but magnetic permeable material in between the magnetic source and the powder/parts, the attractive force between the powder/parts and the magnetic source may be reduced by increasing the distance between them, allowing for easy movement of powder and simultaneous cleaning of the magnetic source. In some cases, this can be used as a gripper system for ferrous parts or a conveying system for ferrous powder. For instance, as shown in FIGS. 20A-20B, by raising and lowering the magnet within a container, an object such as a part, powder, etc. may be picked up or dropped by decreasing and increasing the magnetic attraction force, respectively.

Figure 21A:
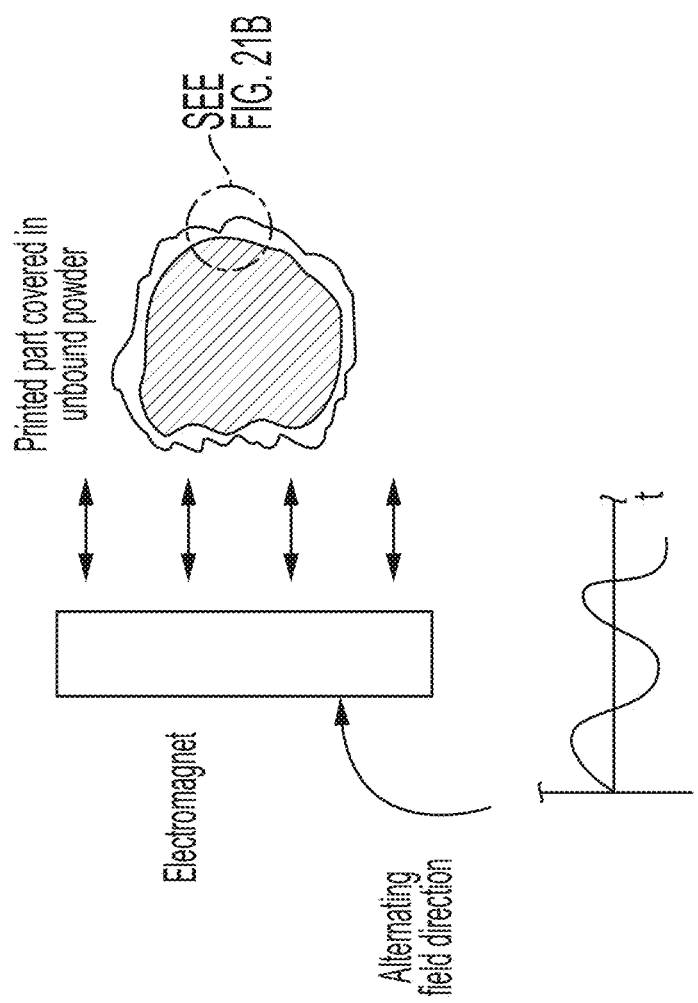
FIGS. 21A-21B depict an illustrative example of applying an alternating magnetic field to particles of a powder, according to some embodiments.
Figure 21B:
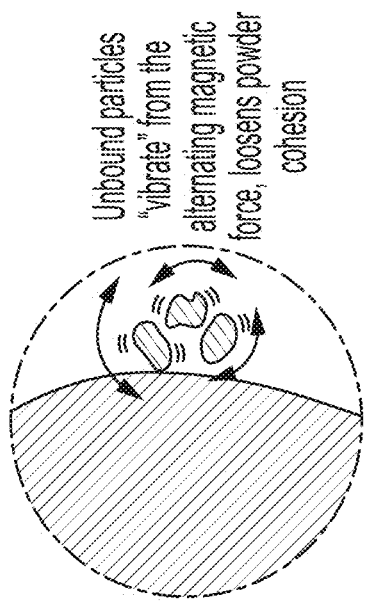

FIGS. 21A-21B depict an illustrative example of applying an alternating magnetic field to particles of a powder, according to some embodiments. In the example of FIGS. 21A-21B, an electromagnet may be operated to produce an alternating magnetic field, which may vibrate ferromagnetic particles and cause them to flow more easily via fluidization. The powder bed or parts in fine depowdering can be exposed to a high-frequency magnetic field of enough amplitude to reorient the particles of unbound powder. On a particle-scale, the alternating field shakes each particle such that on a holistic sense the powder bed vibrates and increases bulk flowability.

Figure 22:
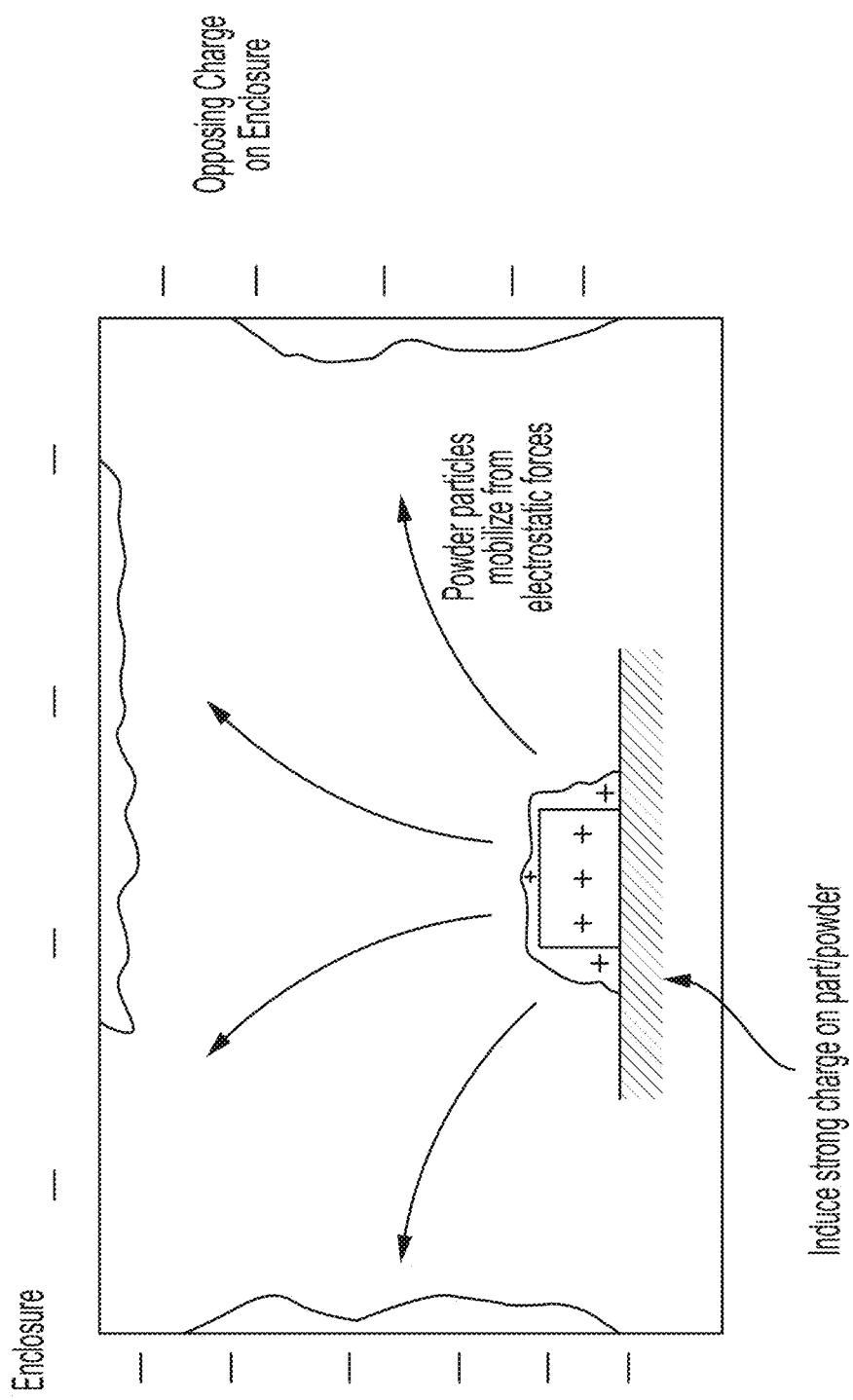
FIG. 22 depicts an illustrative example of applying an electrostatic force to particles of a powder, according to some embodiments.

FIG. 22 depicts an illustrative example of applying an electrostatic force to particles of a powder, according to some embodiments. In the example of FIG. 22, a mixture of powder and parts is arranged within an enclosure, which are both electrically charged with opposing charges. As a result, a force is induced between the powder/parts and the enclosure. Due to the lower mass of the powder, it is more easily mobilized toward the enclosure walls than the parts. In some cases, this approach may be complimented with other means of aeration to break cohesion between powder particles and the part.

An illustrative implementation of a computer system 2300 that may be used to perform any of the techniques described above is shown in FIG. 23. The computer system 2300 may include one or more processors 2310 and one or more non-transitory computer-readable storage media (e.g., memory 2320 and one or more non-volatile storage media 2330). The processor 2310 may control writing data to and reading data from the memory 2320 and the non-volatile storage device 2330 in any suitable manner, as the aspects of the invention described herein are not limited in this respect. To perform functionality and/or techniques described herein, the processor 2310 may execute one or more instructions stored in one or more computer-readable storage media (e.g., the memory 2320, storage media, etc.), which may serve as non-transitory computer-readable storage media storing instructions for execution by the processor 2310.

In connection with techniques described herein, code used to, for example, generate instructions that, when executed, cause an additive fabrication device to fabricate one or more parts, cause a depowdering system to automatically perform depowdering operations (e.g., metering a powder bed, activating/deactivating a vibration source, etc.) may be stored on one or more computer-readable storage media of computer system 2300. Processor 2310 may execute any such code to perform any of the above-described techniques as described herein. Any other software, programs or instructions described herein may also be stored and executed by computer system 2300. It will be appreciated that computer code may be applied to any aspects of methods and techniques described herein. For example, computer code may be applied to interact with an operating system to transmit instructions to an additive fabrication device or depowdering system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for extracting one or more additively fabricated parts from a powder bed comprising a ferromagnetic powder and the one or more additively fabricated parts, the method comprising:
   arranging the powder bed comprising the ferromagnetic powder and the one or more additively fabricated parts within an enclosure, the enclosure having one or more magnetic filters arranged within;
   directing, using one or more nozzles, one or more jets of gas onto a surface of the powder bed within the enclosure to displace at least some of the ferromagnetic powder and thereby expose at least some of the one or more additively fabricated parts; and
   capturing at least some of the displaced ferromagnetic powder on and/or within the one or more magnetic filters.

2. The method of claim 1, wherein the one or more magnetic filters comprise one or more permanent magnets.

3. The method of claim 1, wherein the one or more magnetic filters each comprise a non-magnetic permeable material arranged over a magnetic material.

4. The method of claim 1, wherein the one or more jets of gas are directed downward onto the surface of the powder bed and wherein the one or more magnetic filters are arranged on one or more interior side walls of the enclosure.

* * * * *